United States Patent
El-Keyi et al.

(10) Patent No.: US 11,451,274 B2
(45) Date of Patent: Sep. 20, 2022

(54) ADAPTIVE DOWNLINK MULTI USER MULTIPLE INPUT MULTIPLE OUTPUT (MU-MIMO)PRECODING USING UPLINK SIGNAL SUBSPACE TRACKING FOR ACTIVE ANTENNA SYSTEMS AAS

(71) Applicant: Telefonaktiebolaget LM Ericsson (publ), Stockholm (SE)

(72) Inventors: Amr El-Keyi, Kanata (CA); Svante Bergman, Hägersten (SE); Yongquan Qiang, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 66 days.

(21) Appl. No.: 17/055,806

(22) PCT Filed: Jun. 29, 2018

(86) PCT No.: PCT/IB2018/054861
§ 371 (c)(1),
(2) Date: Nov. 16, 2020

(87) PCT Pub. No.: WO2019/220188
PCT Pub. Date: Nov. 21, 2019

(65) Prior Publication Data
US 2021/0234580 A1    Jul. 29, 2021

Related U.S. Application Data

(60) Provisional application No. 62/672,166, filed on May 16, 2018.

(51) Int. Cl.
*H04B 7/0456* (2017.01)
*H04B 7/0452* (2017.01)
*H04B 15/00* (2006.01)

(52) U.S. Cl.
CPC ......... *H04B 7/0456* (2013.01); *H04B 7/0452* (2013.01); *H04B 15/00* (2013.01)

(58) Field of Classification Search
CPC .... H04B 7/0456; H04B 7/0452; H04B 15/00; H04L 25/0204
See application file for complete search history.

(56) References Cited

U.S. PATENT DOCUMENTS

| | | | |
|---|---|---|---|
| 2011/0058598 A1* | 3/2011 | Gaur | H04L 25/03057 375/233 |
| 2012/0114064 A1* | 5/2012 | Kotecha | H04B 7/0456 375/295 |

(Continued)

FOREIGN PATENT DOCUMENTS

| EP | 3128680 A1 | 2/2017 |
|---|---|---|
| WO | 2018033207 A1 | 2/2018 |

OTHER PUBLICATIONS

B. Yang, "Projection approximation subspace tracking", IEEE Trans. Signal Processing, vol. 43, No. 1, pp. 95-107 (Year: 1995).*

(Continued)

*Primary Examiner* — Vineeta S Panwalkar
(74) *Attorney, Agent, or Firm* — Christopher & Weisberg, P.A.

(57) ABSTRACT

A method, base station and user equipment are disclosed. A base station configured to communicate with a plurality of user equipments is provided. The base station includes processing circuitry configured to: track a downlink signal subspace for each UE of the plurality of UEs, and determine a Multi-User Multiple-Input Multiple-Output, MU-MIMO, precoders based on the downlink signal subspace for each UE of the plurality of UEs. The MU-MIMO precoders are configured to at least in part suppress intra-cell MU-MIMO interference.

22 Claims, 12 Drawing Sheets

(56) References Cited

U.S. PATENT DOCUMENTS

2015/0215014 A1 7/2015 Zhu et al.
2017/0272134 A1* 9/2017 Yuan .................... H04B 7/0617

OTHER PUBLICATIONS

International Search Report and Written Opinion dated Feb. 1, 2019 for International Application No. PCT/IB2018/054861 filed on Jun. 29, 2018, consisting of 12-pages.

B. Yang; Projection Approximation Subspace Tracking; IEEE Transactions on Signal Processing; Jan. 1, 1995; pp. 95-107, vol. 43, No. 1; XP-001056165. consisting of 14-pages.

H. Huh Et al; Achieving Massive MIMO Spectral Efficiency With a Not So Large Number of Antennas; IEEE Transactions on Wireless Communications, vol. 11 No. 9, pp. 3226-3239; Sep. 2012, consisting of 14-pages.

C Lim et al; Recent Trend of Multiuser MIMO in LTE Advanced; IEEE Communications Magazine, vol. 51, No. 3; pp. 127-135; Mar. 2013, consisting of 9-pages.

M.Dottling; Assessment of Advanced Beamfoming and MIMO Technologies; Winner D2.7 Ver 1.0; Feb. 28, 2005, consisting of 190-pages.

M.N. a. M.S.S Savazi; A Comparative Analysis of Spatial Multiplexing Techniques for Outdoor MIMO-OFDM Systems with a Limited Feedback Constraint; IEEE Transactions on Vehicular Technology; vol. 58, No. 1; pp. 218-230; Jan. 2009, consisting of 13-pages.

J. Zhang et al; Statistical Massive MIMO Design Based on Uplink Eigenspace Tracking; International Conference on Wireless Communications and Signal Processing (WCSP); Nanjing, Nov. 13, 2020, consisting of 5-pages.

* cited by examiner

ADAPTIVE DOWNLINK MULTI USER MULTIPLE INPUT MULTIPLE OUTPUT (MU-MIMO)PRECODING USING UPLINK SIGNAL SUBSPACE TRACKING FOR ACTIVE ANTENNA SYSTEMS AAS

CROSS-REFERENCE TO RELATED APPLICATIONS

This application is a Submission Under 35 U.S.C. § 371 for U.S. National Stage Patent Application of International Application No. PCT/IB2018/054861, filed Jun. 29, 2018 entitled "ADAPTIVE DOWNLINK MULTI-USER MULTIPLE-INPUT MULTIPLE-OUTPUT(MU-MIMO) PRECODING USING UPLINK SIGNAL SUBSPACE TRACKING FOR ACTIVE ANTENNA SYSTEMS (AAS)," which claims priority to U.S. Provisional Application No. 62/672,166, filed May 16, 2018, entitled "ADAPTIVE DOWNLINK MULTI-USER MULTIPLE-INPUT MULTIPLE-OUTPUT(MU-MIMO) PRECODING USING UPLINK SIGNAL SUBSPACE TRACKING FOR ACTIVE ANTENNA SYSTEMS (AAS)," the entireties of both of which are incorporated herein by reference.

TECHNICAL FIELD

The present disclosure relates to wireless communications, and in particular, to precoders based on a tracked uplink or downlink signal subspace for each user equipment for at least in part suppressing intra-cell interference.

BACKGROUND

Massive Multiple-In-Multiple-Out (MIMO) is implemented in Fourth Generation and beyond (4G+) cellular networks due to its ability to improve the spectral efficiency of the wireless communication system. However, optimal Massive MIMO precoding in Massive MIMO may require acquisition of instantaneous Channel State Information at the Transmitter (CSIT), which may consume a considerable amount of system resources. As a result, utilizing second-order statistics, i.e., the covariance matrix, of a wireless channel in designing Massive MIMO precoding algorithms has been proposed in order to reduce the overhead of CSIT acquisition. A dual-structure precoding scheme that utilizes preprocessing based on the second-order statistics of the channel and a subsequent linear precoding based on the instantaneous CSIT has also been considered in 4G and beyond 4G wireless standards such as 5G or New Radio.

A Grid of Beams (GoB) algorithm has been proposed for single user MIMO (SU-MIMO) and MU-MIMO precoding. The GoB algorithm employs a set of fixed (predetermined) precoders (beams) for downlink beamforming that focus the transmission in the direction of the target user equipment (UE). Furthermore, GoB may be implemented without requiring codebook feedback from the UEs. The GoB algorithm recursively estimates the wideband covariance matrix of the channel of each UE using the uplink channel estimates. The covariance matrix estimate may then be used to estimate the beam index that can be used for downlink SU-MIMO transmission for each UE. Non-adaptive reshaping of the beam pattern of SU-MIMO GoB has been proposed in order to limit intra-cell interference in MU-MIMO transmission by reducing the leakage from the sidelobes of the radiation pattern. Also, adaptive beam pattern reshaping has been proposed to limit intra-cell interference in MU-MIMO transmission by placing a null in the beam direction of each paired UE. However, these proposed methods may fail to take into account the effects of multipath propagation in MU-MIMO transmission, which may cause significant interference.

SUMMARY

Some embodiments advantageously provide methods, systems, and apparatuses for providing precoders based on a tracked downlink signal subspace for each user equipment for at least in part suppressing intra-cell interference.

Some embodiments described herein relate to a method, base station and UEs, where the base station is measuring uplink sounding or demodulation reference signals from the UEs to track multiple channel eigenvectors over time per UE. The tracked eigenvectors are used to compute adaptive downlink MU-MIMO precoders for the MU-MIMO-co-scheduled UEs for suppressing the MU-MIMO interference as well as achieving good beamforming gain even in environments with severe multipath propagation.

According to one aspect of the disclosure, a base station configured to communicate with a plurality of user equipments (UEs), the base station comprising processing circuitry configured to: track a downlink signal subspace for each user equipment, UE, of the plurality of UEs, and determine a Multi-User Multiple-Input Multiple-Output, MU-MIMO, precoders based on the downlink signal subspace for each UE of the plurality of UEs, the MU-MIMO precoders being configured to at least in part suppress intra-cell MU-MIMO interference.

According to one embodiment of this aspect, the base station of claim 1, wherein the determining of the MU-MIMO precoders includes determining MU-MIMO beamforming vectors of paired UEs of the plurality of UEs, the beamforming vectors are configured to at least in part suppress intra-cell MU-MIMO interference. According to one embodiment of this aspect, the downlink signal subspace includes significant eigenvectors and eigenvalues of a covariance matrix of the downlink channel for each UE of the plurality of UEs. According to one embodiment of this aspect, the tracking of the downlink signal subspace for each UE of the plurality of UEs includes: estimating a M×R matrix whose columns are R significant eigenvectors of the covariance matrix, e.g., the eigenvalues containing 90% of the channel power, where M and R are positive integers, and estimating a R×R diagonal matrix corresponding to eigenvalues of the covariance matrix.

According to one embodiment of this aspect, a plurality of dimensions of the covariance matrix are less than or equal to a number of antennas of the base station. According to one embodiment of this aspect, the covariance matrix corresponds to the covariance matrix for an antenna polarization. According to one embodiment of this aspect, the tracking of the downlink signal subspace provides information about a Line of Sight (LoS) propagation component of the downlink channel and a plurality of multipath propagation components of the downlink channel. According to one embodiment of this aspect, the tracking of the downlink signal subspace is based on at least one of an uplink demodulation reference signal (DMRS) and an uplink sounding reference signal (SRS).

According to one embodiment of this aspect, the processing circuitry is further configured to: determine a Single User (SU)-MIMO precoder for a UE of the plurality of UEs based on the tracked downlink signal subspace, estimate signal leakage between the two UEs of the plurality of UEs based on the SU-MIMO precoders, and pair at least two UEs of the plurality of UEs if the estimated leakage is below a predefined threshold. According to one embodiment of this aspect, the MU-MIMO precoders are for the at least two UEs of the plurality of UEs that are paired for MU-MIMO co-scheduling.

According to one aspect of the disclosure, a method for a base station configured to communicate with a plurality of user equipments (UEs) is provided. A downlink signal subspace is tracked for each user equipment, UE, of the plurality of UEs. A Multi-User Multiple-Input Multiple-Output, MU-MIMO, precoders are determined based on the downlink signal subspace for each UE of the plurality of UEs where the MU-MIMO precoders are configured to at least in part suppress intra-cell MU-MIMO interference.

According to one embodiment of this aspect, the determining of the MU-MIMO precoders includes determining MU-MIMO beamforming vectors of paired UEs of the plurality of UEs, the beamforming vectors are configured to at least in part suppress intra-cell MU-MIMO interference. According to one embodiment of this aspect, the downlink signal subspace includes significant eigenvectors and eigenvalues of a covariance matrix of the downlink channel for each UE of the plurality of UEs. According to one embodiment of this aspect, the tracking of the downlink signal subspace for each UE of the plurality of UEs includes: estimating an M×R matrix whose columns are R significant eigenvectors of the covariance matrix, where M and R are positive integers, and estimating an R×R diagonal matrix corresponding to eigenvalues of the covariance matrix.

According to one embodiment of this aspect, a plurality of dimensions of the covariance matrix are less than or equal to a number of antennas of the base station. According to one embodiment of this aspect, the covariance matrix corresponds to the covariance matrix for an antenna polarization. According to one embodiment of this aspect, the tracking of the downlink signal subspace provides information about a Line of Sight (LoS) propagation component of the downlink channel and a plurality of multipath propagation components of the downlink channel.

According to one embodiment of this aspect, the tracking of the downlink signal subspace is based on at least one of an uplink demodulation reference signal (DMRS) and an uplink sounding reference signal (SRS). According to one embodiment of this aspect, the processing circuitry is further configured to: determine a Single User (SU)-MIMO precoder for a UE of the plurality of UEs based on the tracked downlink signal subspace, estimate signal leakage between two UEs of the plurality of UEs based on the SU-MIMO precoders, and pair at least two UEs of the plurality of UEs if the estimated leakage is below a predefined threshold. According to one embodiment of this aspect, the MU-MIMO precoders are for the at least two UEs of the plurality of UEs that are paired for MU-MIMO co-scheduling.

According to one aspect of the disclosure, a first user equipment (UE) configured to communicate with a base station, the first UE comprising processing circuitry configured to: perform wireless communication using Multi-User Multiple-Input Multiple-Output, MU-MIMO, precoders, the MU-MIMO precoders being based on tracking of a downlink signal subspace for each UE of a plurality of UEs, the plurality of UEs including the first UE, the MU-MIMO precoders being configured to at least in part suppress intra-cell MU-MIMO interference.

According to one embodiment of this aspect, the MU-MIMO precoders correspond to MU-MIMO beamforming vectors of paired UEs of the plurality of UEs, the beamforming vectors are configured to at least in part suppress intra-cell MU-MIMO interference.

According to one embodiment of this aspect, the downlink signal subspace includes significant eigenvectors and eigenvalues of a covariance matrix of the downlink channel for each UE of the plurality of UEs. According to one embodiment of this aspect, a plurality of dimensions of the covariance matrix are less than or equal to a number of antennas of the base station. According to one embodiment of this aspect, the covariance matrix corresponds to the covariance matrix for an antenna polarization.

According to one embodiment of this aspect, the tracking of the downlink signal subspace provides information about a Line of Sight (LoS) propagation component of the downlink channel and a plurality of multipath propagation components of the downlink channel. According to one embodiment of this aspect, the processing circuitry is further configured to transmit at least one of an uplink demodulation reference signal (DMRS) and an uplink sounding reference signal (SRS). The tracking of the downlink signal subspace is based on the transmitted one of the uplink DMRS and/or uplink SRS. According to one embodiment of this aspect, the MU-MIMO precoders are for co-scheduling the first UE with another UE of the plurality of UEs.

According to one aspect of the disclosure, a method of a first user equipment (UE) configured to communicate with a base station is provided. Wireless communication is performed using Multi-User Multiple-Input Multiple-Output, MU-MIMO, precoders. The MU-MIMO precoders are based on tracking of a downlink signal subspace for each UE of a plurality of UEs. The plurality of UEs include the first UE. The MU-MIMO precoders are configured to at least in part suppress intra-cell MU-MIMO interference.

According to one embodiment of this aspect, the MU-MIMO precoders correspond to MU-MIMO beamforming vectors of paired UEs of the plurality of UEs, the beamforming vectors are configured to at least in part suppress intra-cell MU-MIMO interference. According to one embodiment of this aspect, the downlink signal subspace includes significant eigenvectors and eigenvalues of a covariance matrix of the downlink channel for each UE of the plurality of UEs. According to one embodiment of this aspect, a plurality of dimensions of the covariance matrix are less than or equal to a number of antennas of the base station. According to one embodiment of this aspect, the covariance matrix corresponds to the covariance matrix for an antenna polarization.

According to one embodiment of this aspect, the tracking of the downlink signal subspace provides information about a Line of Sight (LoS) propagation component of the downlink channel and a plurality of multipath propagation components of the downlink channel. According to one embodiment of this aspect, transmitting at least one of an uplink demodulation reference signal (DMRS) and an uplink sounding reference signal (SRS), and the tracking of the downlink signal subspace is based on the transmitted at least one of the uplink DMRS and uplink SRS. According to one embodiment of this aspect, the MU-MIMO precoders are for co-scheduling the first UE with another UE of the plurality of UEs.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 2:
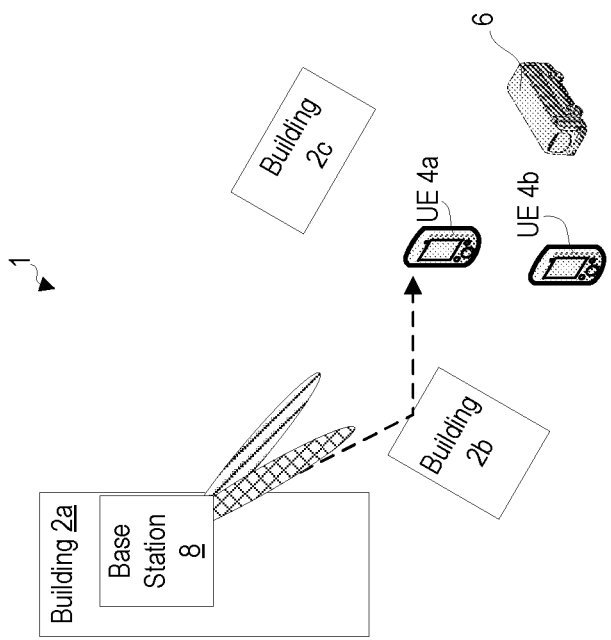
FIG. 2 is a diagram of the example wireless communication system environment having at least one different propagation path.
Figure 1:
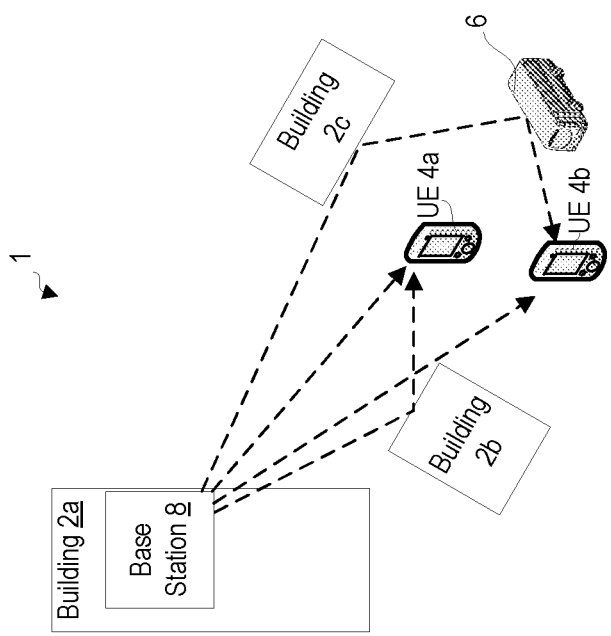
FIG. 1 is a diagram of an example wireless communication system environment having various propagation paths.

As discussed above, utilizing second-order statistics, i.e., the covariance matrix, of a wireless channel in designing Massive MIMO precoding algorithms has been proposed in order to reduce the overhead of CSIT acquisition. Computationally efficient acquisition of second-order channel statistics for downlink Multiple User (MU)-MIMO beamforming has been proposed in which the principal eigenvector of the covariance matrix of the channel to each user equipment (UE) is estimated recursively using a projection approximation subspace tracking algorithm. However, only the principal eigenvector of the covariance matrix of each UE was used for MU-MIMO precoding. This arrangement may not provide enough MU-MIMO interference suppression in practical channels with non-line-of-sight (NLOS) multipath propagation. For example, consider the scenario 1 that is shown in FIGS. 1-2 where FIG. 1 is a diagram of an example wireless communication system environment having various propagation paths and FIG. 2 is a diagram of the example wireless communication system environment having at least one different propagation path than illustrated in FIG. 1, both FIGS. 1-2 illustrate system 1. System 1 includes one or more structures such as buildings 2a-2c (collectively referred to as building or structure 2), one or more UEs 4a-4b (collectively referred to as UE 4), object 6 such as automobile 6 and base station 8. In one or more embodiments, base station 8 is located proximate building 2a such as on the side of building 2a or on the roof, for example. Each UE 4 receives the transmission of the base station 8 along the direct path direction (as indicated by the dashed lines traveling at a single angle) as well as along one multipath direction (as indicated by the dashed lines traveling in multiple angles). Even though the two UEs 4 are spatially well-separated, MU-MIMO transmission to UE 4a may cause significant interference at UE 4b due to the signal component received from the multipath propagation direction of UE 4b.

This example illustrates why multipath path propagation effects may be taken into account while deciding which UEs may be paired together in a MU-MIMO transmission as well as taken into account while designing MU-MIMO precoders to suppress both the interference received along the direct paths and reflected paths (multipath). Some existing system employing MU-MIMO try to limit interference between co-scheduled UEs such as by employing either static sidelobe control mechanisms or adaptive null steering to limit the interference between co-scheduled UEs. However, even with adaptive beam reshaping, only a single null may be placed for each MU-MIMO paired UE, i.e., at the direction of the main beam. As a result, the performance of MU-MIMO reshaped GoB degrades in non-line-of-sight communication scenarios due to interference leakage from multipath directions as the reshaped beam pattern nulls are placed in the direction of the direct path component of each paired UE only.

Some existing adaptive downlink MU-MIMO beamforming algorithms may consider only the principal eigenvector for MU-MIMO pairing (co-scheduling) decisions and downlink beamforming. As a result, these existing adaptive downlink MU-MIMO beamforming algorithms do not provide enough robustness against multipath propagation effects that cause the signal subspace of each UE to have a rank much higher than 1.

Some embodiments of the disclosure may solve, at least in part, at least one of the problems with existing systems. For example, while some existing algorithms such as MU-MIMO GoB algorithm implement either static side lobe control or adaptive null steering to try to limit interference, these existing algorithms still suffer from interference leakage from multipath directions. In contrast to these existing algorithms, some embodiments of the disclosure may advantageously allow tracking the downlink signal subspace in MU-MIMO such as to provide more information about interference leakage from more multipath directions, thereby allowing for selection of paired UEs, obtaining of SINR estimates after pairing and determining of MU-MIMO precoders for reducing interference for the paired UEs, based on this information. For example, as discussed below in detail, some embodiments of the disclosure may provide precoders based on a tracked downlink signal subspace for each user equipment for at least in part suppressing intra-cell interference.

In some embodiments of the disclosure the terms "dominant" and "significant", used in reference to eigenvalues and eigenvectors, may be used interchangeably. In some embodiments, "significant eigenvectors" are associated with eigenvalues that have a high value, e.g., the eigenvalues representing 90% (or another pre-determined fraction) of the channel power '

In one or more embodiments, some embodiments of the disclosure may be implemented in Long Term Evolution (LTE) Frequency Division Duplex (FDD) Active Antenna System (AAS) such as to allow the base station to achieve downlink wideband Single User (SU)- and MU-massive MIMO beamforming gains without the need for codebook feedback (i.e., LTE release 13 code book feedback) from the UEs. Implementing some embodiments of the disclosure, SU-MIMO and MU-MIMO downlink beamforming can be performed to provide high throughput to LTE UEs, such as LTE pre-Release 13 UEs, while realizing the benefits of LTE AAS.

For the SU-MIMO case, some embodiments of the disclosure provide for better performance than GoB SU-MIMO beamforming (e.g., legacy Release 13-based GoB SU-MIMO beamforming) at reduced computational complexity.

For the MU-MIMO case, some embodiments of the disclosure provide improved performance when compared with the existing MU-MIMO GoB algorithm(s). Performance evaluation implementing some embodiments of the disclosure were performed using Redhawk system level simulations for a practical 21-cell Frequency Division Duplex (FDD) configuration with 1.7 GHz uplink carrier frequency and 2.1 GHz downlink carrier frequency, random user locations, and full-downlink buffers at each UE, where the results show that the teachings described herein provide a 10% improvement in the average downlink cell throughput over MU-MIMO GoB in the 5G Urban Macro SCM channel with NLOS propagation conditions, as described herein.

Before describing in detail exemplary embodiments, it is noted that the embodiments reside primarily in combinations of apparatus components and processing steps related to adaptive downlink MU-MIMO precoding. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "base station" used herein can be any kind of base station (BS) comprised in a radio network which may further comprise any of network node, radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core base station (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The base station may also comprise test equipment. The term "radio node" used herein may be used to also denote a user equipment (UE) such as a UE or a radio base station.

In some embodiments, the non-limiting terms wireless device (WD) or a user equipment (UE) are used interchangeably. The UE herein can be any type of user equipment capable of communicating with a base station or another UE over radio signals, such as user equipment (UE). The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio base station" is used. It can be any kind of a radio base station which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this may not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a user equipment or a base station may be distributed over a plurality of user equipments and/or base stations. In other words, it is contemplated that the functions of the base station and user equipment described herein are not limited to performance by a single physical device and, in fact, can be distributed among several physical devices.

A cell may be generally a communication cell, e.g., of a cellular or mobile communication network, provided by a node. A serving cell may be a cell on or via which a network node/base station (the node providing or associated to the cell, e.g., base station or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

It may be considered for cellular communication that there is provided at least one uplink (UL) connection and/or channel and/or carrier and at least one downlink (DL) connection and/or channel and/or carrier, e.g., via and/or defining a cell, which may be provided by a base station, in particular a network node, gNB or eNodeB. An uplink direction may refer to a data transfer direction from a user equipment to a base station, e.g., network node and/or relay station. A downlink direction may refer to a data transfer direction from a base station, e.g., network node and/or relay node, to a user equipment. UL and DL may be associated to different frequency resources, e.g., carriers and/or spectral bands. A cell may comprise at least one uplink carrier and at least one downlink carrier, which may have different frequency bands. A base station, e.g., a network node, gNB or eNodeB, may be adapted to provide and/or define and/or control one or more cells, e.g., a PCell and/or a LA cell.

Transmitting in downlink may pertain to transmission from the network or base station to the user equipment. Transmitting in uplink may pertain to transmission from the user equipment to the network or base station. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between base stations, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a user equipment or wireless device or node may involve instructing and/or causing the user equipment or node to change its configuration, e.g., at least one setting and/or register entry and/or operational mode. A user equipment or wireless device or node may be adapted to configure itself, e.g., according to information or data in a memory of the user equipment or wireless device. Configuring a node or user equipment or wireless device by another device or node or a network may refer to and/or comprise transmitting information and/or data and/or instructions to the user equipment or node by the other device or node or the network, e.g., allocation data (which may also be and/or comprise configuration data) and/or scheduling data and/or scheduling grants. Configuring a user equipment may include sending allocation/configuration data to the terminal indicating which modulation and/or encoding to use. A user equipment may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Generally, configuring may include determining configuration data representing the configuration and providing, e.g., transmitting, it to one or more other nodes (parallel and/or sequentially), which may transmit it further to the radio node (or another node, which may be repeated until it reaches the user equipment). Alternatively, or additionally, configuring a radio node, e.g., by a base station or other device, may include receiving configuration data and/or data pertaining to configuration data, e.g., from another node like a base station, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a user equipment (e.g., terminal) may comprise scheduling downlink and/or uplink transmissions for the user equipment, e.g. downlink data and/or downlink control signaling and/or DCI and/or uplink control or data or communication signaling, in particular acknowledgement signaling, and/or configuring resources and/or a resource pool therefor. In particular, configuring a user equipment (e.g., terminal) may comprise configuring the user equipment to perform certain measurements on certain subframes or radio resources and reporting such measurements according to embodiments of the present disclosure.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DMRS according to 3GPP and/or LTE technologies. Demodulation reference signaling may generally be considered to represent signaling providing reference for a receiving device like a user equipment to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Data may refer to any kind of data, in particular any one of and/or any combination of control data or user data or payload data. Control information (which may also be referred to as control data) may refer to data controlling and/or scheduling and/or pertaining to the process of data transmission and/or the network or user equipment operation.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide precoders based on a tracked downlink signal subspace for each user equipment for at least in part suppressing intra-cell interference.

Figure 3:
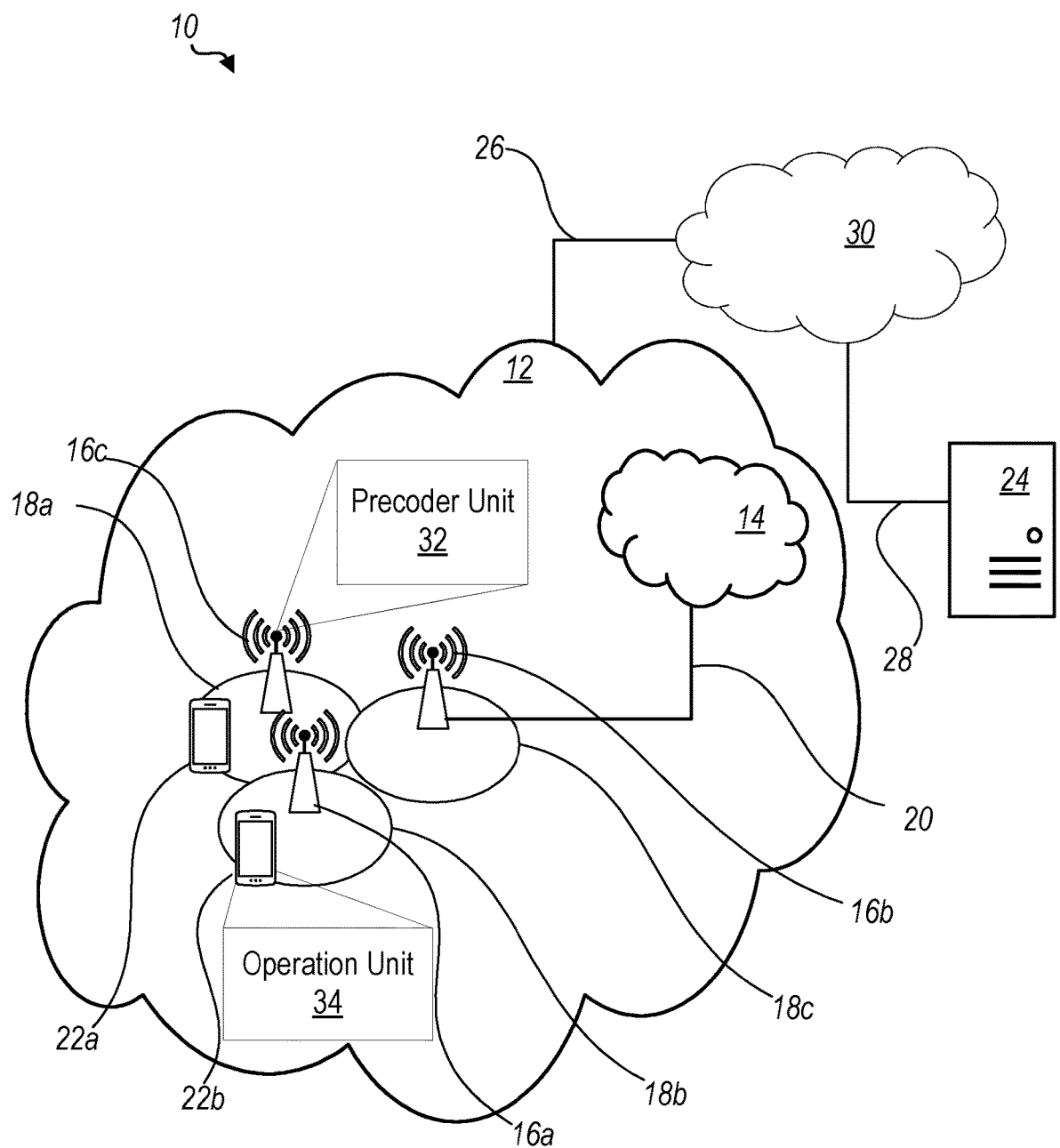
FIG. 3 is a schematic diagram of an example network architecture illustrating a communication system connected via an intermediate network to a host computer according to the principles in the disclosure.

Returning to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of base stations 16a, 16b, 16c (referred to collectively as base stations 16), such as NBs, eNBs, gNBs or other types of wireless access points, each defining a corresponding coverage area 18a, 18b, 18c (referred to collectively as coverage areas 18). Each base station 16a, 16b, 16c is connectable to the core network 14 over a wired or wireless connection 20. A first user equipment (UE) 22a located in coverage area 18a is configured to wirelessly connect to, or be paged by, the corresponding base station 16c. A second UE 22b in coverage area 18b is wirelessly connectable to the corresponding base station 16a. While a plurality of UEs 22a, 22b (collectively referred to as UE 22) are illustrated in this example, the disclosed embodiments are equally applicable to a situation where a sole UE 22 is in the coverage area or where a sole UE 22 is connecting to the corresponding base station 16. Note that although only two UEs 22 and three base stations 16 are shown for convenience, the communication system may include many more UEs 22 and base stations 16.

Also, it is contemplated that a UE 22 can be in simultaneous communication and/or configured to separately communicate with more than one base station 16 and more than one type of base station 16. For example, a UE 22 can have dual connectivity with a base station 16 that supports LTE and the same or a different base station 16 that supports NR. As an example, UE 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected UEs 22a, 22b and the host computer 24. The connectivity may be described as an over-the-top (OTT) connection. The host computer 24 and the connected UEs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a base station 16 may not or need not be informed about the past routing of an incoming downlink communication with data originating from a host computer 24 to be forwarded (e.g., handed over) to a connected UE 22a. Similarly, the base station 16 need not be aware of the future routing of an outgoing uplink communication originating from the UE 22a towards the host computer 24.

A base station 16 is configured to include a precoder unit 32 which is configured to determine and/or provide MU-MIMO precoders to at least in part suppress intra-cell MU-MIMO interference, as described herein. A user equipment 22 includes an operation unit 34 which is configured to perform at least one user equipment operation such as assembling data and signaling information for communication as described herein. As one example, operation unit 34 may be configured to facilitate wireless communication by implementing/using MU-MIMO precoders. In one or more embodiments, the MU-MIMO precoders implemented by UE 22 are based on tracking of a downlink signal subspace for one or more UEs 22 of a plurality of UEs 22 where the MU-MIMO precoders are configured to at least in part suppress intra-cell MU-MIMO interference such as between the UE 22 implementing the precoder and at least one other UE 22.

In accordance with an embodiment, example implementations of the UE 22, base station 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a UE 22 connecting via an OTT connection 52 terminating at the UE 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the base station 16 and or the user equipment 22. The processing circuitry 42 of the host computer 24 may include an information unit 54 configured to enable the service provider to determine and/or provide the precoders described herein.

The communication system 10 further includes a base station 16 provided in a communication system 10 and comprising hardware 58 enabling it to communicate with the host computer 24 and with the UE 22. The hardware 58 may include a communication interface 60 for setting up and maintaining a wired or wireless connection with an interface of a different communication device of the communication system 10, as well as a radio interface 62 for setting up and maintaining at least a wireless connection 64 with a UE 22 located in a coverage area 18 served by the base station 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the base station 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the base station 16 further has software 74 stored internally in, for example, memory 72, or stored in external memory (e.g., database, storage array, network storage device, etc.) accessible by the base station 16 via an external connection. The software 74 may be executable by the processing circuitry 68. The processing circuitry 68 may be configured to control any of the methods and/or processes described herein and/or to cause such methods, and/or processes to be performed, e.g., by base station 16. Processor 70 corresponds to one or more processors 70 for performing base station 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to base station 16. For example, processing circuitry 68 of the base station 16 may include precoder unit 32 configured to determine and/or provide MU-MIMO precoders to at least in part suppress intra-cell MU-MIMO interference, as described herein.

The communication system 10 further includes the UE 22 already referred to. The UE 22 may have hardware 80 that may include a radio interface 82 configured to set up and maintain a wireless connection 64 with a base station 16 serving a coverage area 18 in which the UE 22 is currently located. The radio interface 82 may be formed as or may include, for example, one or more RF transmitters, one or more RF receivers, and/or one or more RF transceivers.

The hardware 80 of the UE 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 90, which is stored in, for example, memory 88 at the UE 22, or stored in external memory (e.g., database, storage array, network storage device, etc.) accessible by the UE 22. The software 90 may be executable by the processing circuitry 84. The software 90 may include a client application 92. The client application 92 may be operable to provide a service to a human or non-human user via the UE 22, with the support of the host computer 24. In the host computer 24, an executing host application 50 may communicate with the executing client application 92 via the OTT connection 52 terminating at the UE 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by UE 22. The processor 86 corresponds to one or more processors 86 for performing UE 22 functions described herein. The UE 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to UE 22. For example, the processing circuitry 84 of the user equipment 22 may include an operation unit 34 configured to perform communications as described herein.

Figure 4:
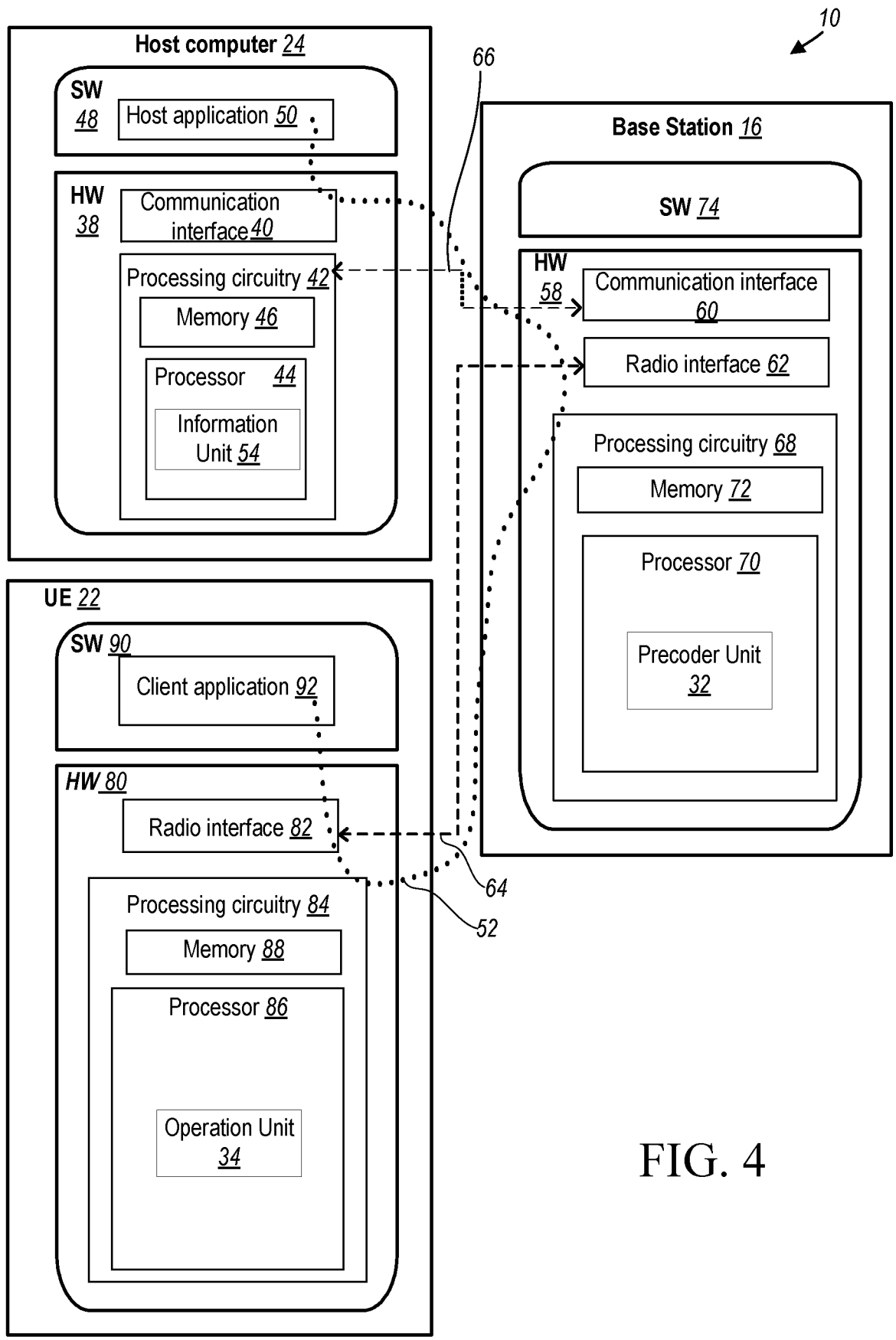
FIG. 4 is a block diagram of a host computer communicating via a base station with a user equipment over an at least partially wireless connection according to some embodiments of the disclosure.

In some embodiments, the inner workings of the base station 16, UE 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the user equipment 22 via the base station 16, without explicit reference to any intermediary devices and the precise routing of messages via these devices. Network infrastructure may determine the routing, which it may be configured to hide from the UE 22 or from the service provider operating the host computer 24, or both. While the OTT connection 52 is active, the network infrastructure may further take decisions by which it dynamically changes the routing (e.g., on the basis of load balancing consideration or reconfiguration of the network). The wireless connection 64 between the UE 22 and the base station 16 is in accordance with some embodiments of the embodiments described throughout this disclosure. One or more of the various embodiments improve the performance of OTT services provided to the UE 22 using the OTT connection 52, in which the wireless connection 64 may form the last segment. More precisely, some embodiments of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and UE 22, in response to variations in the measurement results. The measurement procedure and/or the network functionality for reconfiguring the OTT connection 52 may be implemented in the software 48 of the host computer 24 or in the software 90 of the UE 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the base station 16, and it may be unknown or imperceptible to the base station 16. Some such procedures and functionalities may be known and practiced in the art. In certain embodiments, measurements may involve proprietary UE signaling facilitating the host computer 24's measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the UE 22. In some embodiments, the cellular network also includes the base station 16 with a radio interface 62. In some embodiments, the base station 16 is configured to, and/or the base station 16's processing circuitry 68 is configured to perform the functions and/or methods described herein for preparing/initiating/maintaining/supporting/ending a transmission to the UE 22, and/or preparing/terminating/maintaining/supporting/ending in receipt of a transmission from the UE 22.

In some embodiments, the host computer 24 includes processing circuitry 42 and a communication interface 40 that is configured to a communication interface 40 configured to receive user data originating from a transmission from a UE 22 to a base station 16. In some embodiments, the UE 22 is configured to, and/or comprises a radio interface 82 and/or processing circuitry 84 configured to perform the functions and/or methods described herein for preparing/initiating/maintaining/supporting/ending a transmission to the base station 16, and/or preparing/terminating/maintaining/supporting/ending in receipt of a transmission from the base station 16.

Although FIGS. 3 and 4 show various "units" such as precoder unit 32, and operation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 5, 6:
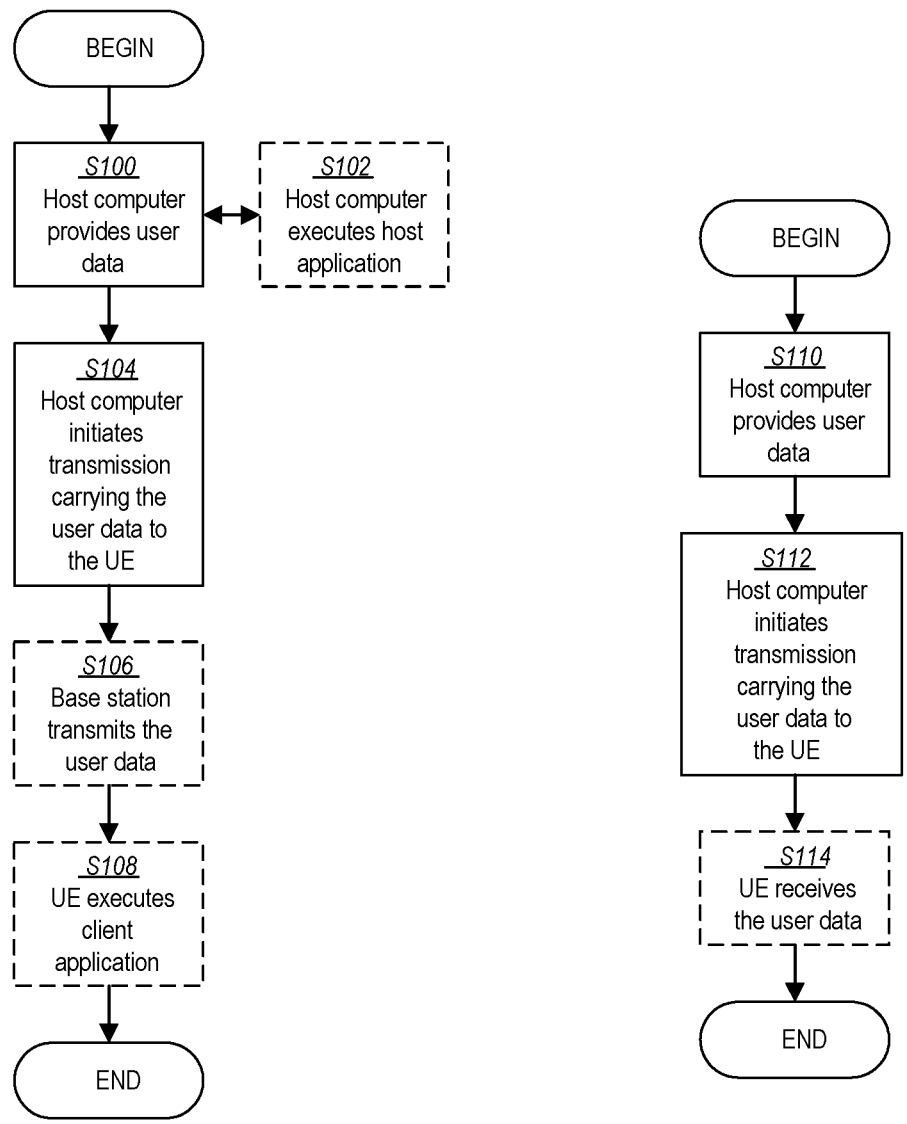
FIG. 5 is a flowchart illustrating an exemplary method implemented in a communication system for a user equipment to execute a client application in accordance with some embodiments of the present disclosure.
FIG. 6 is a flowchart illustrating another exemplary method implemented in a communication system for a user equipment to receive user data in accordance with some embodiments of the present disclosure.

FIG. 5 is a flowchart illustrating an exemplary method implemented in a communication system, such as, for example, the communication system of FIGS. 3 and 4, for a user equipment 22 to execute a client application in accordance with one embodiment. The communication system may include a host computer 24, a base station 16 and a UE 22, which may be those described with reference to FIG. 4. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the UE 22 (block S104). In an optional third step, the base station 16 transmits to the UE 22 the user data which was carried in the transmission that the host computer 24 initiated, in accordance with some embodiments of the embodiments described throughout this disclosure (block S106). In an optional fourth step, the UE 22 executes a client application, such as, for example, the client application 114, associated with the host application 74 executed by the host computer 24 (block S108).

FIG. 6 is a flowchart illustrating an exemplary method implemented in a communication system, such as, for example, the communication system of FIG. 3, for a user equipment 22 to receive user data in accordance with one embodiment. The communication system may include a host computer 24, a base station 16 and a UE 22, which may be those described with reference to FIGS. 3 and 4. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the UE 22 (block S112). The transmission may pass via the base station 16, in accordance with some embodiments of the embodiments described throughout this disclosure. In an optional third step, the UE 22 receives the user data carried in the transmission (block S114).

Figure 7:
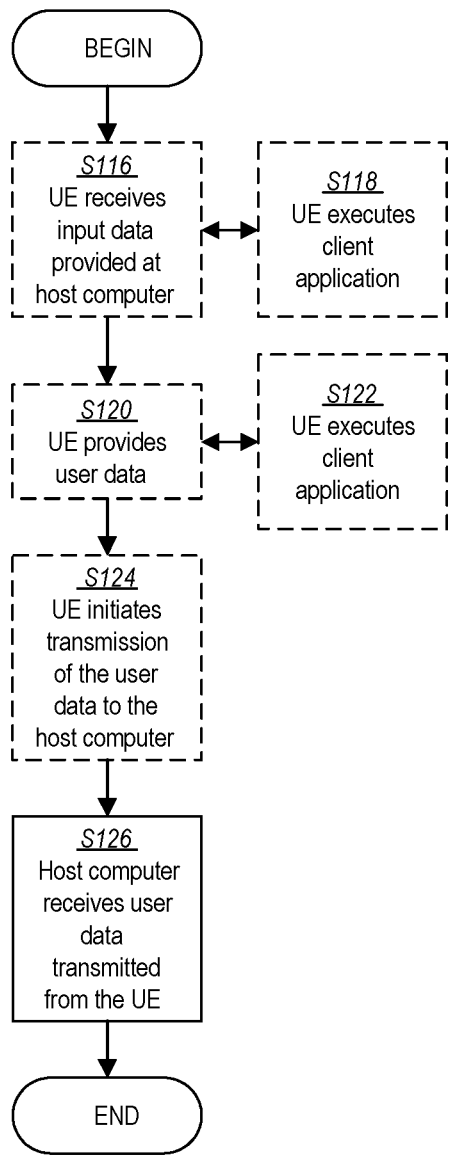
FIG. 7 is a flowchart illustrating another exemplary method implemented in a communication system for a host computer to receive user data from the user equipment in accordance with some embodiments of the present disclosure.

FIG. 7 is a flowchart illustrating an exemplary method implemented in a communication system, such as, for example, the communication system of FIG. 3, for a host computer to receive user data from the user equipment 22 in accordance with one embodiment. The communication system may include a host computer 24, a base station 16 and a UE 22, which may be those described with reference to FIGS. 3 and 4. In an optional first step of the method, the UE 22 receives input data provided by the host computer 24 (block S116). In an optional substep of the first step, the UE 22 executes the client application 114, which provides the user data in reaction to the received input data provided by the host computer 24 (block S118). Additionally or alternatively, in an optional second step, the UE 22 provides user data (block S120). In an optional substep of the second step, the UE 22 provides the user data by executing a client application, such as, for example, client application 114 (block S122). In providing the user data, the executed client application 114 may further consider user input received from the user.

Regardless of the specific manner in which the user data was provided, the UE 22 may initiate, in an optional third substep, transmission of the user data to the host computer 24 (block S124). In a fourth step of the method, the host computer 24 receives the user data transmitted from the UE 22, in accordance with some embodiments of the embodiments described throughout this disclosure (block S126).

Figure 8:
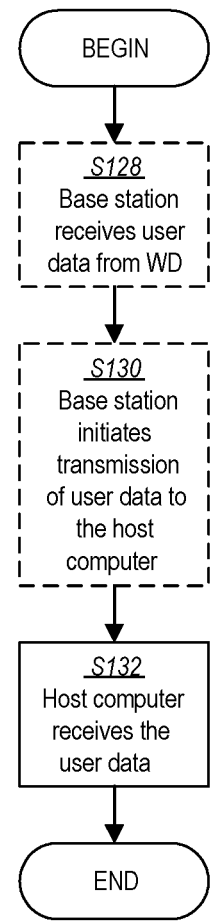
FIG. 8 is a flowchart illustrating another exemplary method implemented in a communication system for a host computer to receive user data in accordance with some embodiments of the present disclosure.

FIG. 8 is a flowchart illustrating an exemplary method implemented in a communication system, such as, for example, the communication system of FIG. 3, for a host computer to receive user data in accordance with one embodiment. The communication system may include a host computer 24, a base station 16 and a UE 22, which may be those described with reference to FIGS. 3 and 4. In an optional first step of the method, in accordance with some embodiments of the embodiments described throughout this disclosure, the base station 16 receives user data from the UE 22 (block S128). In an optional second step, the base station 16 initiates transmission of the received user data to the host computer 24 (block S130). In a third step, the host computer 24 receives the user data carried in the transmission initiated by the base station 16 (block S132).

Figure 9:
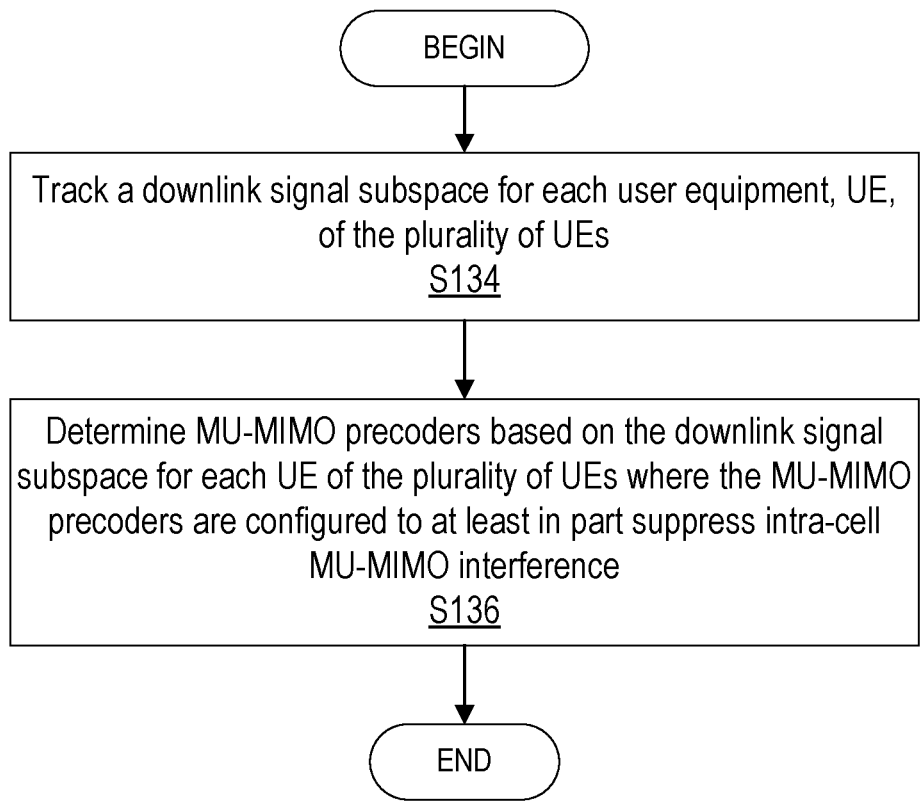
FIG. 9 is a flowchart of an example process in a base station for determining and/or providing MU-MIMO precoders to at least in part suppress intra-cell MU-MIMO interference according to some embodiments of the disclosure.

FIG. 9 is a flowchart of an exemplary process in a base station 16 for determining and/or providing MU-MIMO precoders to at least in part suppress intra-cell MU-MIMO interference, as described herein. Base station 16 such as via processing circuitry 68 is configured to track a downlink signal subspace for each UE 22 of a plurality of UEs 22, as described herein (block S134). Base station 16, such as via processing circuitry 68, is configured to determine MU-MIMO precoders based on the downlink signal subspace for each UE 22 of the plurality of UEs 22 where the MU-MIMO precoders configured to at least in part suppress intra-cell MU-MIMO interference, as described herein (block S136).

According to one or more embodiments, the determining of the MU-MIMO precoders includes determining MU-MIMO beamforming vectors of paired UEs 22 of the plurality of UEs 22 where the beamforming vectors are configured to at least in part suppress intra-cell MU-MIMO interference. According to one or more embodiments, the downlink signal subspace includes significant eigenvectors and eigenvalues of a covariance matrix of the downlink channel for the UE 22.

According to one or more embodiments, the determining of the MU-MIMO precoders includes determining MU-MIMO beamforming vectors of paired UEs 22 of the plurality of UEs 22, the beamforming vectors are configured to at least in part suppress intra-cell MU-MIMO interference. According to one or more embodiments, the downlink signal subspace includes significant eigenvectors and eigenvalues of a covariance matrix of the downlink channel for each UE 22 of the plurality of UEs 22. According to one or more embodiments, the tracking of the downlink signal subspace for each UE 22 of the plurality of UEs 22 includes: estimating an M×R matrix whose columns are R significant eigenvectors of the covariance matrix eigenv, where M and R are positive integers, and estimating an R×R diagonal matrix corresponding to eigenvalues of the covariance matrix.

According to one or more embodiments, a plurality of dimensions of the covariance matrix are less than or equal to a number of antennas of the base station 16. According to one or more embodiments, the covariance matrix corresponds to the covariance matrix for an antenna polarization. According to one or more embodiments, the tracking of the downlink signal subspace provides information about a Line of Sight (LoS) propagation component of the downlink channel and a plurality of multipath propagation components of the downlink channel.

According to one or more embodiments, the tracking of the downlink signal subspace is based on one of an uplink demodulation reference signal (DMRS) and an uplink sounding reference signal (SRS). According to one or more embodiments, the processing circuitry 68 is further configured to: determine a Single User (SU)-MIMO precoder for a UEs 22 of the plurality of UEs 22 based on the tracked downlink signal subspace, estimate signal leakage between two UEs 22 of the plurality of UEs 22 based on the SU-MIMO precoders, and pair at least two UEs 22 of the plurality of UEs 22 if the estimated leakage is below a predefined threshold. According to one or more embodiments, the MU-MIMO precoders are for the at least two UEs 22 of the plurality of UEs 22 that are paired for MU-MIMO co-scheduling.

Figure 10:
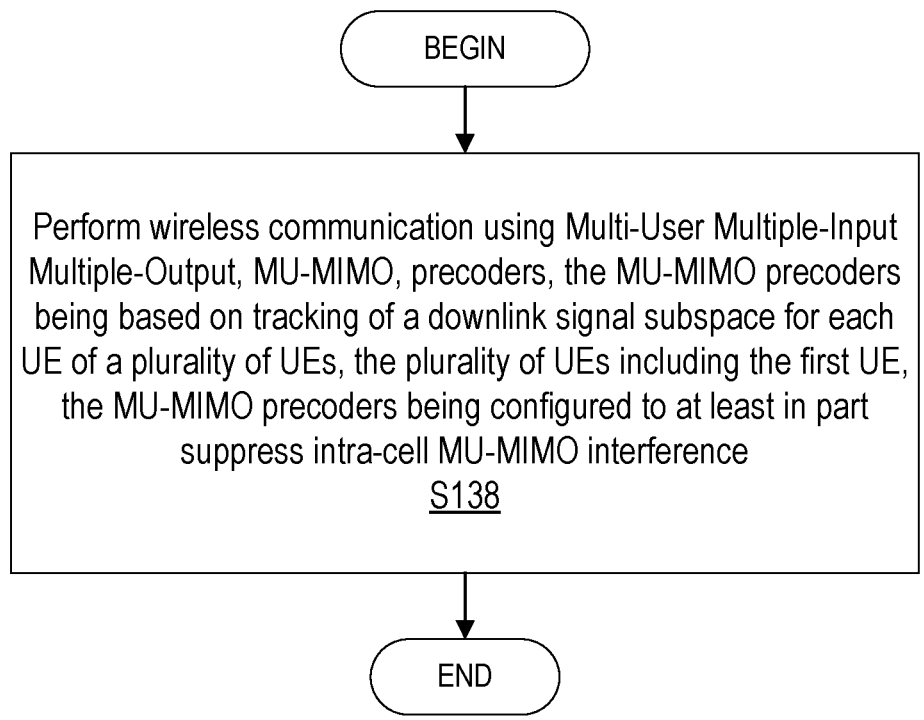
FIG. 10 is a flowchart of an example process in a user equipment for performing wireless communications according to some embodiments of the disclosure.

FIG. 10 is a flowchart of an exemplary process in a UE 22 according to some embodiments of the present disclosure. UE 22 such as via processing circuitry 84 is configured to perform wireless communication using MU-MIMO precoders where the MU-MIMO precoders are based on tracking of a downlink signal subspace for each UE 22 of a plurality of UEs 22 where the MU-MIMO precoders are configured to at least in part suppress intra-cell MU-MIMO interference, as described herein (block S138). In one or more embodiments, base station 16 signals the at least one MU-MIMO precoder to the UE 22.

According to one or more embodiments, the MU-MIMO precoders correspond to MU-MIMO beamforming vectors of paired UEs 22 of the plurality of UEs 22. The beamforming vectors are configured to at least in part suppress intra-cell MU-MIMO interference. According to one or more embodiments, the downlink signal subspace includes significant eigenvectors and eigenvalues of a covariance matrix of the downlink channel for the UE 22.

According to one or more embodiments, a plurality of dimensions of the covariance matrix are less than or equal to a number of antennas of the base station 16. According to one or more embodiments, the covariance matrix corresponds to the covariance matrix for an antenna polarization. According to one or more embodiments, the tracking of the downlink signal subspace provides information about a Line of Sight (LoS) propagation component of the downlink channel and a plurality of multipath propagation components of the downlink channel. According to one or more embodiments, the processing circuitry 84 is further configured to transmit one of an uplink demodulation reference signal (DMRS) and an uplink sounding reference signal (SRS), and the tracking of the downlink signal subspace is based on the transmitted one of the uplink DMRS and uplink SRS. According to one or more embodiments, the MU-MIMO precoders are for co-scheduling at least one UE 22 with another UE 22 of the plurality of UEs 22.

Having generally described arrangements for providing adaptive downlink MU-MIMO precoding for wireless communications, details for these arrangements, functions and processes are described below, and may be implemented by the base station 16, user equipment 22 and/or host computer 24.

Algorithm

Figure 11:
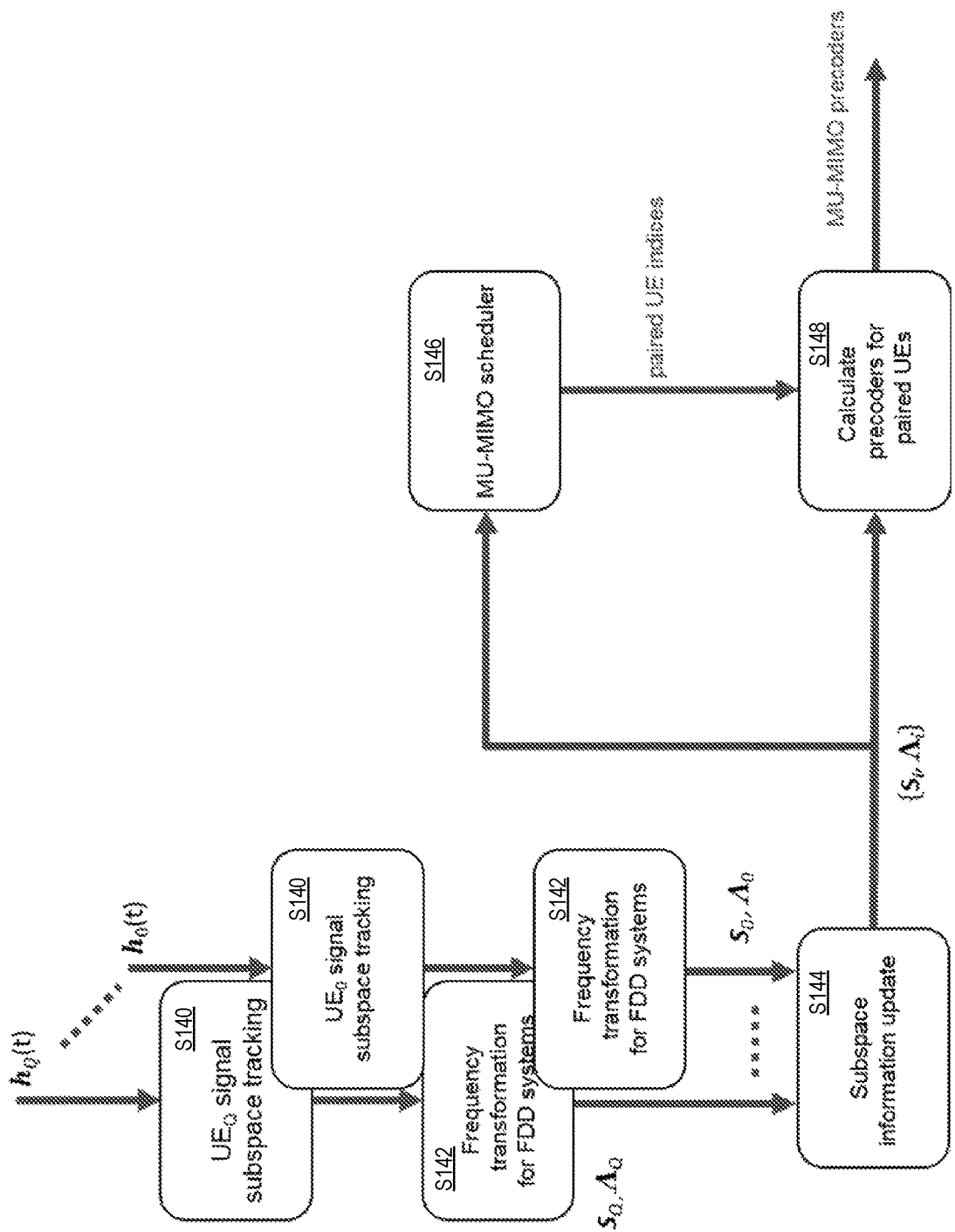
FIG. 11 is a flow chart of an example process for downlink MU-MIMO precoding algorithm according to some embodiments of the disclosure.

FIG. 11 is a flow diagram of a downlink multiuser MIMO precoding algorithm. For example, base station 16 such as via processing circuitry 68 is configured to perform signal subspace tracking of a plurality of UEs 22 such as $UE_{0-Q}$ (block S140).

Base station 16 such as via processing circuitry 68 is configured to perform frequency transformation for FDD systems such as to generate $S_{0-Q}$ and $\Lambda_{0-Q}$ (block S142). In one or more embodiments, S is a matrix, as described herein. In one or more embodiments, $\Lambda$ is a matrix, as described herein. Base station 16 such as via processing circuitry 68 is configured to determine a subspace information update (block S144). For example, processing circuitry 68 determines subspace information such as $\{S_i, \Lambda_i\}$. In one or more embodiments, $S_i$ is a matrix such as an M×R matrix whose columns are R significant eigenvectors of a covariance matrix, as described herein. In one or more embodiments, $\Lambda_i$ is an R×R diagonal matrix, as described herein.

Base station 16 such as via processing circuitry 68 is configured to provide the subspace information to the MU-MIMO scheduler for determining UE 22 pairing indices, as described herein (block S146). Base station 16, such as via processing circuitry 68, is configured to calculate precoders for paired UEs 22, i.e., determine MU-MIMO precoders, as described herein (block S148).

The algorithm/process described herein uses a subspace tracking block for each UE 22 of a plurality of UEs 22 that can estimate the downlink signal subspace, i.e., the dominant eigenvectors and the associated eigenvalues of the covariance matrix of the downlink channel to this UE 22. Each subspace tracking block utilizes the uplink channel estimates obtained from the uplink reference signals of its associated UE 22 and can optionally apply uplink/downlink conversion for the estimated eigenvectors to account for large duplex gaps in FDD systems. The signal subspace information of the scheduling UE candidates is used to compute the MU-MIMO beamforming vectors of the paired UEs 22 to suppress intra-cell MU-MIMO interference. Below, each block in FIG. 11 is described in detail.

Signal Subspace Tracking (Block S140)

The base station 16 iteratively estimates and tracks most or greater than half of all dominant eigen R vectors of the wideband covariance matrix of the uplink channel of each UE 22 using the uplink channel estimates obtained from the uplink Demodulation Reference Signal (DMRS) and/or Sounding Reference Signal (SRS). The projection approximation subspace tracking with deflation (PASTd) algorithm can be used for the purpose of tracking the dominant eigenvectors and eigenvalues of the channel covariance matrix with small computational complexity or reduced computational complexity when compared to other algorithms. Let M denote the dimension of the channel vector whose covariance matrix is to be tracked. Given the set of M-dimensional vectors $\{h_i(n)\}_{n=1}^t$ that represent the estimates of the tracked channel of user i at time instant n=1 to the current time instant t, the PASTd algorithm estimates the M×R matrix $S_i(t)$ whose columns are the R dominant eigenvectors of the covariance matrix of $\hat{h}_i(t)$ by minimizing the following cost function $$J(S_i(t)) = \sum_{n=1}^{t} \beta^{t-n} \left\| \hat{h}_i(n) - S_i(t) S_i^H(t) \hat{h}_i(n) \right\|^2$$

where the forgetting factor $0<\beta\leq 1$ is intended to ensure that data in the past are down-weighted. Note that each input channel vector can be normalized to have unit-norm to improve the convergence speed of the subspace tracking algorithm and eliminate fast fading effects.

In addition to estimating the R dominant eigenvectors in the matrix $S_i(t)$, the PASTd algorithm yields explicit estimates of the corresponding eigenvalues which are stored in the R×R diagonal matrix $\Lambda_i(t)$. Let $S_i(t)=[s_{i,0}(t), \ldots, s_{i,R-1}(t)]$ and $\Lambda_i(t)=\text{diag}\{\lambda_{i,0}(t), \ldots, \lambda_{i,R-1}(t)\}$, the PASTd algorithm is implemented as follows:

- Initialize $\{\gamma_{i,j}(0) = 1\}_{j=1}^R$ and $\{s_{i,j}(0) = e_j\}_{j=1}^R$ where $e_j$ is the $j^{th}$ column of the identity matrix.
- For t = 1, 2, ..., Do:
  ○ Initialize $u_{i,0}(t) = \hat{h}_i(n)$
  ○ For j = 0, ..., R − 1, Do
    ■ Compute the inner product $y_{i,j}(t) = s_{i,j}^H(t-1)u_{i,j}(t)$
    ■ Compute the estimate of the exponentially-weighted eigenvalue $\gamma_{i,j}(t) = \beta\gamma_{i,j}(t-1) + |y_{i,j}(t)|^2$
    ■ Compute the Mx1 innovation vector $v_{i,j}(t) = u_{i,j}(t) - s_{i,j}(t-1)y_{i,j}(t)$
    ■ Update $s_{i,j}(t) = s_{i,j}(t-1) + v_{i,j}(t)\dfrac{\gamma_{i,j}^*(t)}{\gamma_{i,j}(t)}$
    ■ Compute the deflated measurement $u_{i,j+1}(t) = u_{i,j}(t) - s_{i,j}(t)y_{i,j}(t)$ Note that if estimates of the channel of user i are available from multiple frequencies at a time instant t, $\beta<1$ is set in the first iteration to account for the channel time-varying property and set $\beta=1$ for the remaining frequency samples because they have equal effect to the estimation of eigenvectors for the same wideband covariance matrix. The eigenvalue $\lambda_{i,j}(t)$ can be computed by dividing the exponentially-weighted eigenvalue $\gamma_{i,j}(t)$ by the effective memory length $W_L$ of the exponential window. For a constant forgetting factor $\beta$, the effective memory length is given by $W_L=1/(1-\beta)$.

The described PASTd algorithm may require only 4MR+2R complex multiplications per iteration which is typically lower than the cost of updating the estimate of the full covariance matrix (which may require $M^2$ complex multiplications). In addition, only 2MR+R real parameters may be stored for each UE whereas the full covariance matrix may require storing an M×M complex Hermitian matrix. In one or more embodiments, the PASTd algorithm is advantageously configured to perform subspace tracking and/or other functions described herein such as to allow a reduced computational complexity method for subspace tracking where the tracked subspace may then be used to help for performing one or more actions/functions such as suppressing intra-cell MU-MIMO interference, determining SU-MIMO precoders, among other actions/functions, as described herein.

Note that the dimension of the covariance matrix can be less than or equal to the number of antennas at the base station. For example, consider the 2D uniformly-spaced dual-polarized antenna array shown in FIG. 12 where $M_V$ and $M_H$ respectively denote the number of rows and columns of the 2D array and the total number of antenna elements of the array is given by $2M_V M_H$. However, the covariance matrix of the channel from the antennas with the 45° slant can be assumed to be equal to that from the antennas with the −45° slant, i.e., the $2M_V M_H \times 2M_V M_H$ covariance matrix of the full channel can be written as $$C_X = \begin{bmatrix} C & 0 \\ 0 & C \end{bmatrix}$$

where the $M_V M_H \times M_V M_H$ Matrix C is the covariance matrix per polarization. As a result, it may be sufficient to track the signal subspace of the matrix C which represents the covariance of the channel per antenna polarization.

Figure 12:
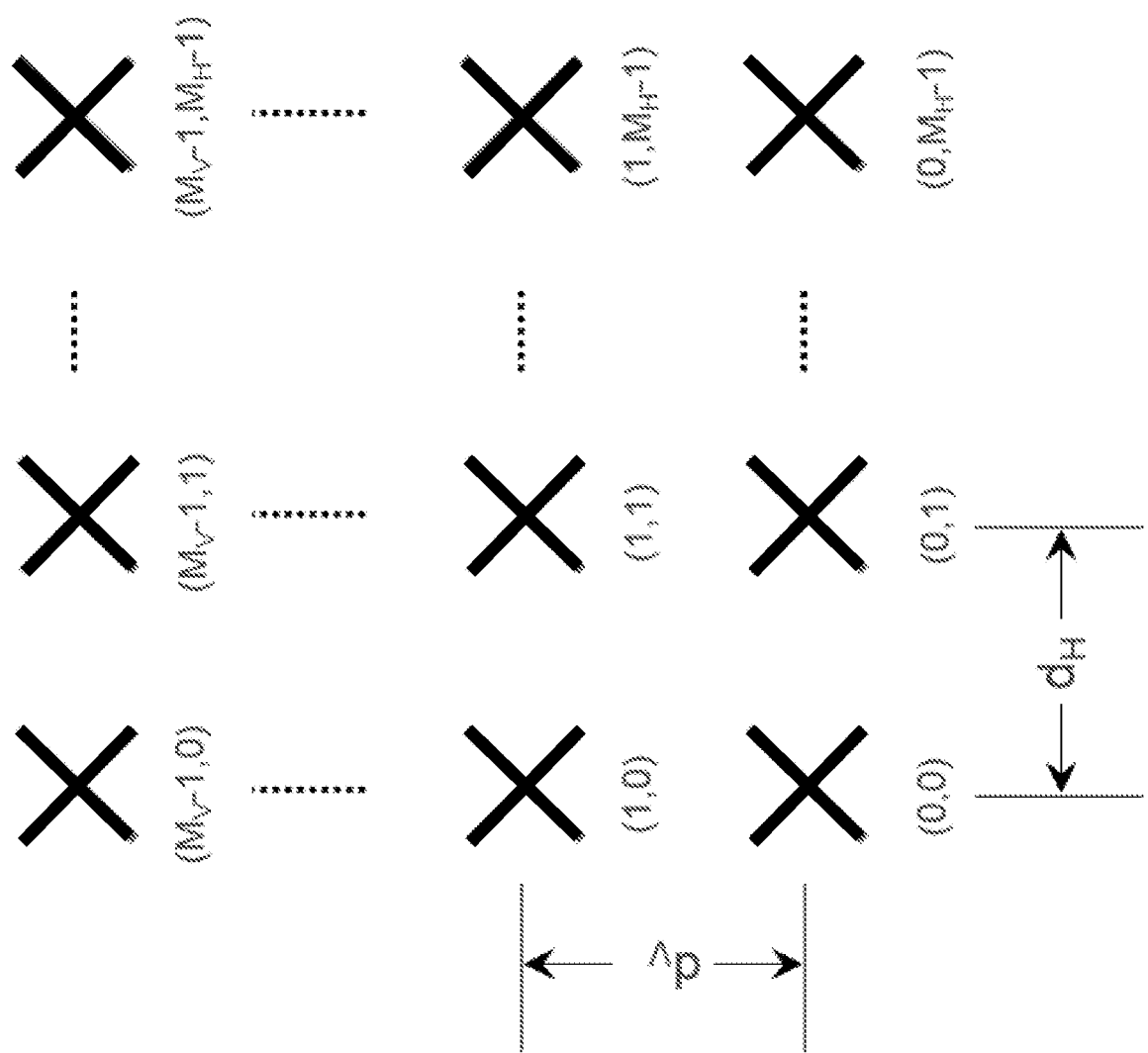
FIG. 12 is a block diagram of a two dimensional uniformly-spaced dual polarized antenna array according to some embodiments of the disclosure.

The dual polarized antenna array is shown in FIG. 12. In this case, a subspace tracking block is implemented to track the covariance matrix per polarization, i.e., the dimension of each tracked eigenvector is equal to $M=M_H M_V$. The 2 $M_H M_V \times 1$ estimate of the full channel vector of the ith UE may be expressed as $$\hat{h}_i(t) = [\hat{h}_i^{(0)T}(t), \hat{h}_i^{(1)T}(t)]^T$$

where $\hat{h}_i^{(0)}(t)$ and $\hat{h}_i^{(1)}(t)$ are the $M_H M_V \times 1$ vectors corresponding to the two sets of polarized antennas. Since it may be assumed that the covariance matrix is identical for the two polarizations, a single subspace tracking block is used for tracking the signal subspace of the covariance matrix per polarization yielding the estimates $\{S_i(t), \Lambda_i(t)\}$ for the R dominant eigenvectors and eigenvalues of the covariance matrix per polarization.

Note that tracking a larger number of eigenvectors of the signal subspace of a UE 22 may provide more information about the interference leakage to this UE 22 from more multipath directions. This information is used for selecting the paired UEs 22, obtaining estimates of the SINR after pairing, and designing the MU-MIMO precoders for the paired UEs.

Uplink/Downlink Frequency Transformation for FDD Systems (Block S142)

It may be assumed that each of the estimated uplink eigenvectors (for each polarization) is associated with a specific physical propagation direction. The downlink frequency transformation of the estimated uplink eigenvectors may compensate for the difference in the propagation delay due to the difference in uplink and downlink carrier frequencies. Hence, the $j^{th}$ eigenvector of the downlink channel to UE i can be estimated from the corresponding uplink eigenvector as $$s_{i,j}^{(DL)} = T_{i,j} s_{i,j}^{(UL)}$$

where $T_{i,j}$ is an $M_H M_V \times M_H M_V$ diagonal matrix whose $n^{th}$ diagonal element is given by $$T_{i,j}(n,n) = e^{\sqrt{-1} \frac{2\pi}{c}(f^{(DL)} - f^{(UL)})(x_n \cos(\varphi_{i,j})\sin(\theta_{i,j}) - y_n \sin(\varphi_{i,j})\sin(\theta_{i,j}))}$$

where $c=3\times10^8$ is the speed of light, $f^{(DL)}$ and $f^{(UL)}$ are respectively the downlink and uplink carrier frequencies, $(x_n, y_n)$ is the location of the $n^{th}$ antenna element relative to the first antenna element, and $(\varphi_{i,j}, \theta_{i,j})$ is the (azimuth, zenith) direction associated with the $j^{th}$ eigenvector of the downlink channel to UE i which may be estimated from $s_{i,j}^{(UL)}$.

For a uniformly-spaced 2D array, the diagonal elements of the matrix $T_{i,j}(n, n)$ can be directly computed without explicit estimation of $(\varphi_{i,j}, \theta_{i,j})$. For example, the 2-dimensional uniformly-spaced dual-polarized $M_H \times M_V$ array is shown in FIG. 12. The progressive phase shifts in the horizontal and vertical directions associated with the $j^{th}$ eigenvector of the downlink channel to UE i can be estimated by averaging the phase shifts between successive elements of the eigenvector in the vertical and horizontal directions, i.e., $$\delta_{V_{i,j}}(\varphi_{i,j}, \theta_{i,j}) = \frac{1}{M_H(M_V-1)} \sum_{m=0}^{M_H-1} \sum_{n=1}^{M_V-1} \angle\{s_{i,j}^{(UL)}(m,n)\} - \angle\{s_{i,j}^{(UL)}(m,n-1)\}$$

$$\delta_{H_{i,j}}(\varphi_{i,j}, \theta_{i,j}) = \frac{1}{M_V(M_H-1)} \sum_{m=1}^{M_H-1} \sum_{n=0}^{M_V-1} \angle\{s_{i,j}^{(UL)}(m,n)\} - \angle\{s_{i,j}^{(UL)}(m-1,n)\}$$

where $\angle\{.\}$ denotes the phase of a complex number and $s_{i,j}^{(UL)}(m,n)$ is the entry in the vector $s_{i,j}^{(UL)}$ that corresponds to the antenna element (m, n).

The uplink-downlink frequency transformation matrix $T_{i,j}$ can be estimated as $$T_{i,j} = \text{diag}\{t_{H_{i,j}} \otimes t_{V_{i,j}}\}$$

where the $m^{th}$ element of the $M_H \times 1$ vector $t_{H_{i,j}}$ and the $n^{th}$ element of $M_V \times 1$ vector $t_{V_{i,j}}$ are given respectively by $$t_{H_{i,j}}(m) = e^{\sqrt{-1}(m-1)\left(\frac{f^{(DL)}}{f^{(UL)}} - 1\right) \delta_{H_{i,j}}(\varphi_{i,j}, \theta_{i,j})} \text{ for } m=0,1,\ldots,M_H-1$$

$$t_{V_{i,j}}(n) = e^{\sqrt{-1}(n-1)\left(\frac{f^{(DL)}}{f^{(UL)}} - 1\right) \delta_{V_{i,j}}(\varphi_{i,j}, \theta_{i,j})} \text{ for } m=0,1,\ldots,M_V-1$$

SU-MIMO Precoder Design

The SU-MIMO precoders for each of the candidate UEs 22 can be estimated using the dominant eigenvectors of its covariance matrix. For polarized antenna arrays, the rank $d_i$ SU-MIMO precoder for the $i^{th}$ UE can be obtained by co-phasing the dominant tracked eigenvectors of the covariance matrix per polarization. For example, the rank 2 SU-MIMO precoder for the $i^{th}$ UE is given by $$E_i = \begin{bmatrix} s_{i,0} & 0 \\ 0 & s_{i,0} \end{bmatrix} \begin{bmatrix} 1 & 1 \\ \vartheta_i & -\vartheta_i \end{bmatrix} \frac{d_i}{2}$$

where a fixed co-phasing factor $\vartheta_i$ can be used by the base station 16. Alternately, the base station 16 can use the wideband precoding matrix indicator (PMI) feedback from the UE to determine the co-phasing factor and number of transmitted layers. In this case, the SU-MIMO precoder of the $i^{th}$ UE is given by $$E_i = \begin{bmatrix} s_{i,0} & 0 \\ 0 & s_{i,0} \end{bmatrix} \begin{bmatrix} s_{i,0} & 0 \\ 0 & s_{i,0} \end{bmatrix} \frac{V_{p2a}}{2M_H M_v \times N_p} \frac{V_{PMI}}{N_p \times d_i}$$

where $N_p$ is the number of ports used to transmit the reference symbols for PMI feedback, $V_{p2a}$ is the port to antenna mapping, and $V_{PMI}$ is the reported PMI with rank $d_i$.

MU-MIMO Precoder Design—Blocks S144-S148

Tracking the signal space of the covariance matrix of the UE 22 provides information on the line-of-sight (LoS) propagation component of the channel as well as on the significant multipath propagation components. This information can be utilized in selecting the MU-MIMO co-scheduled UEs 22. Recall that the tracked eigenvector represents the jth dominant receive direction of UE i and that is the expected fraction of power to be received in this direction. Hence, the UEs 22 can be added to a MU-MIMO pairing hypothesis based on a test for the interference power leakage on each other. For example, it may be assumed that UE 22a and UE 22b, e.g., UE 4a and 4b from FIGS. 1-2, pairing is tested. Given the SU-MIMO precoding matrices of the two UEs; $E_0$ and $E_1$, the leakage measure between the two UEs is computed as:

$$m_{0,1} = \left\| \left( I_2 \otimes \Lambda_0^{\frac{1}{2}} S_0^T \right) E_1 \right\|_F^2 + \left\| \left( I_2 \otimes \Lambda_1^{\frac{1}{2}} S_1^T \right) E_0 \right\|_F^2$$

where $\|.\|_F$ denotes the Frobenius norm and $I_2$ is the 2×2 identity matrix. If the leakage measure is smaller than a threshold, then the two UEs can be paired together with limited interference leakage on each other.

In addition to utilizing the tracked signal space information in MU-MIMO co-scheduling decisions, the tracked signal space information can be used to suppress the interference between the paired UEs 22 in MU-MIMO transmission along all the receive directions that carry significant power, i.e., including the direction corresponding to non-line-of-sight (NLOS) propagation. Given a set of MU-MIMO-paired UEs candidates in the current subframe, the beamforming of the paired UEs 22 are calculated using the SU-MIMO precoders for these UEs 22 and the tracked subspace information. For example, it may be assumed that the first L UEs, $\{UE_0, \ldots UE_{L-1}\}$, are co-scheduled in a MU-MIMO transmission and that each UE is receiving 2 communication layers. For the dual-polarized array shown in FIG. 12, the zero-forcing MU-MIMO precoder for $UE_0$ is calculated by computing the projected principal eigenvector $$s_{0,0}^{\perp} = \delta(I - \tilde{S}_0(\tilde{S}_0^H \tilde{S}_0)^{-1} \tilde{S}_0^H) s_{0,0}$$

where the columns of the M×R(L-1) matrix $\tilde{S}_0$ span the signal space of the L-1 UEs paired with $UE_0$, i.e., $\tilde{S}_0 = (S_1 S_2 \ldots S_{L-1})$ and $\delta$ is a power-normalization constant. Note that the matrix $(I - \tilde{S}_0(\tilde{S}_0^H \tilde{S}_0)^{-1} \tilde{S}_0^H)$ is the projection matrix on the null-space of the subspace spanned by the columns of $\tilde{S}_0$ which contains the combined signal subspace of all the UEs 22 paired with $UE_0$. Hence, transmission along the direction $s_0^{\perp}$ does not cause interference along the R dominant receive directions of each of the L-1 UEs that are paired with UE 0. The rank $d_i$ MU-MIMO precoder of each paired UE is computed by co-phasing its projected $$\frac{d_i}{2}$$

eigenvectors, e.g., for example, the rank 2 MU-MIMO precoder for the UE 0 with a fixed co-phasing factor $\vartheta_0$ is given by $$E_0 = \begin{bmatrix} s_{0,0}^{\perp} & 0 \\ 0 & s_{0,0}^{\perp} \end{bmatrix} \begin{bmatrix} 1 & 1 \\ \vartheta_0 & -\vartheta_0 \end{bmatrix}$$

Similarly, the rank 2 SLNR MU-MIMO precoder for $UE_0$ can be calculated by computing the SLNR-projected principal eigenvector $$s_{0,0}^{(SLNR)} = \delta(I - \tilde{S}_0(\tilde{S}_0^H \tilde{S}_0 + \sigma^2 \tilde{\Lambda}_0^{-1})^{-1} \tilde{S}_0^H) s_{0,0}$$

where the matrix $(I - \tilde{S}_0(\tilde{S}_0^H \tilde{S}_0 + \sigma^2 \tilde{\Lambda}_0^{-1})^{-1} \tilde{S}_0^H)$ trades perfect null steering for reduced sidelobe level and $\sigma^2$ is the estimated noise power at the UE 22. Afterwards the MU-MIMO precoder can be computed by co-phasing the SLNR projected eigenvector.

Performance Evaluation

The Third Generation Partnership Project (3GPP, a standardization organization) Case 1 deployment scenario is considered. In this example scenario, which should be considered non-limiting, the uplink/downlink carrier frequency is given by 1.7 GHz/2.1 GHz and UE 22 speed is 3 Km/hr. In some embodiments, the 5G SCM Urban Macro channel model with NLOS communication is used, as is known in the art. In this example scenario, the antenna configuration at the base station is an AAS 32 (4×4×2) configuration. In this example scenario, TM9 transmission scheme with 8 CSI-RS ports is considered. In this example scenario, the system bandwidth may be equal to 20 MHz. In this example scenario, the traffic model for the downlink is selected as full buffer while the uplink has no traffic except for aperiodic CQI every 10 msec. The number of layers transmitted is fixed at 2 for all the considered schemes in this example scenario. Uplink channel estimated is obtained from the uplink DMRS in aperiodic CQI reports where ideal channel estimation is assumed.

Figure 13:
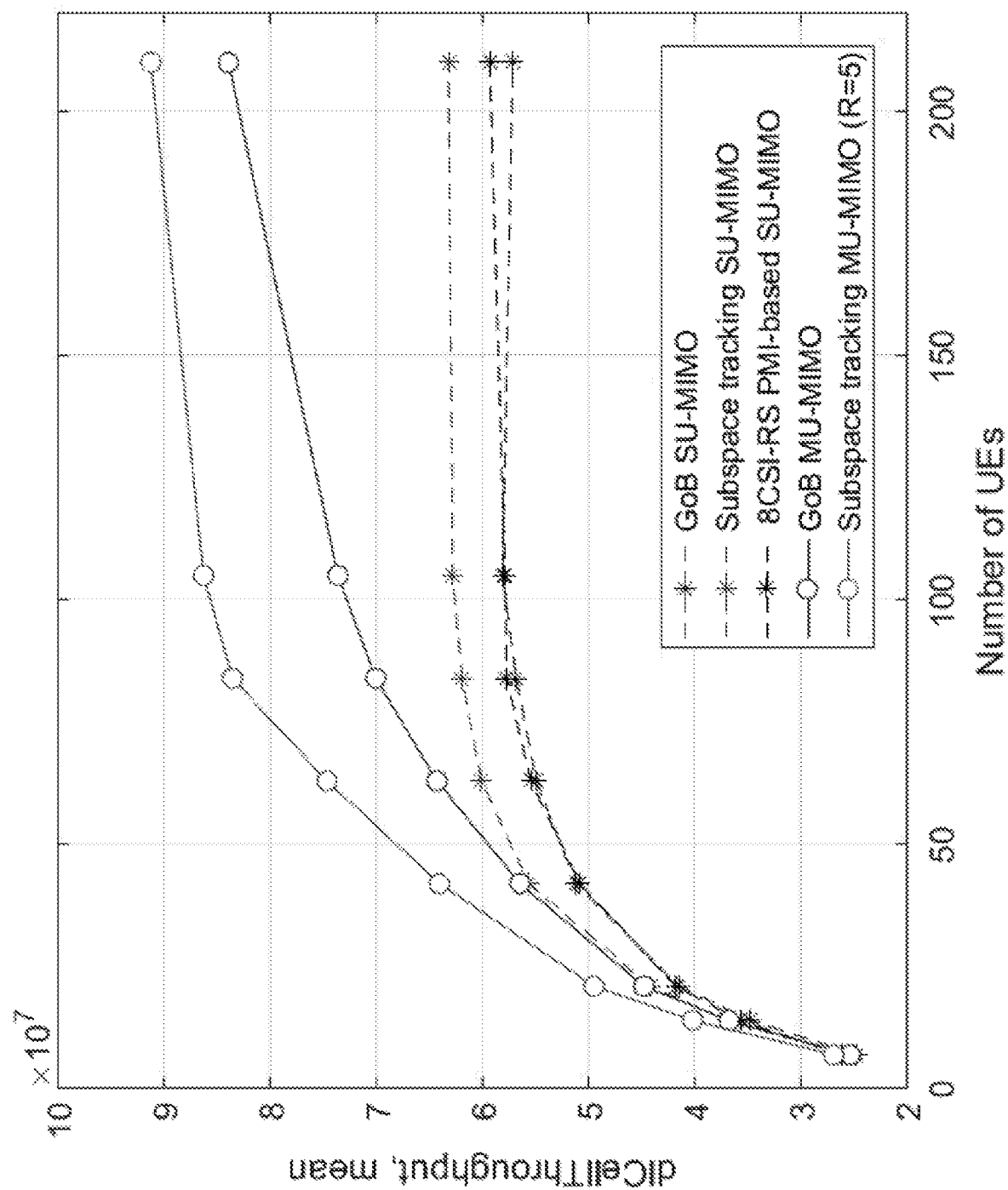
FIG. 13 is a diagram of average cell throughput versus a number of user equipment's according to some embodiments of the disclosure.
Figure 14:
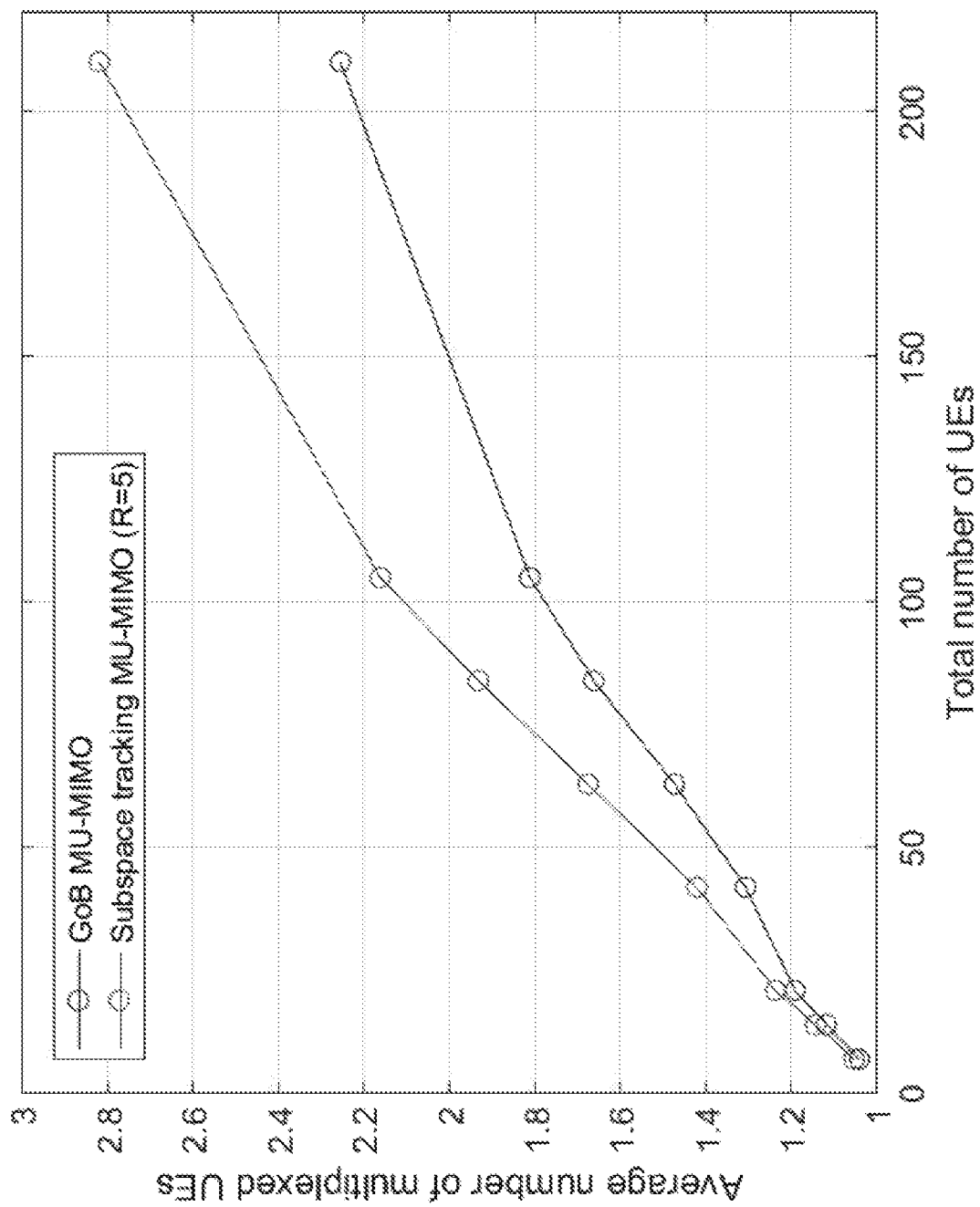
FIG. 14 is a diagram of an average number of multiplexed user equipments versus a number of user equipments according to some embodiments of the disclosure.

A 21-cell simulation is implemented where the UEs 22 are randomly placed. The results are averaged over ten Monte Carlo simulations. FIG. 13 shows the average downlink cell throughput per number of UEs 22. FIG. 13 illustrates that subspace tracking (i.e., subspace tracking SU-MIMO and subspace tracking MU-MIMO) described herein provides 10% improvement over the GoB algorithm both in the SUand MU-MIMO cases. FIG. 14 shows the average number of multiplexed UEs 22 in the MU-MIMO case per number of UEs 22. The subspace tracking based precoding algorithm described herein can multiplex a higher number of UEs 22 than that multiplexed by the GoB algorithm. This may be attributed to the ability of the precoding scheme described herein to adaptively suppress the MU-MIMO interference while the GoB algorithm uses fixed beams with reduced sidelobe level for MU-MIMO interference suppression.

Figure 15:
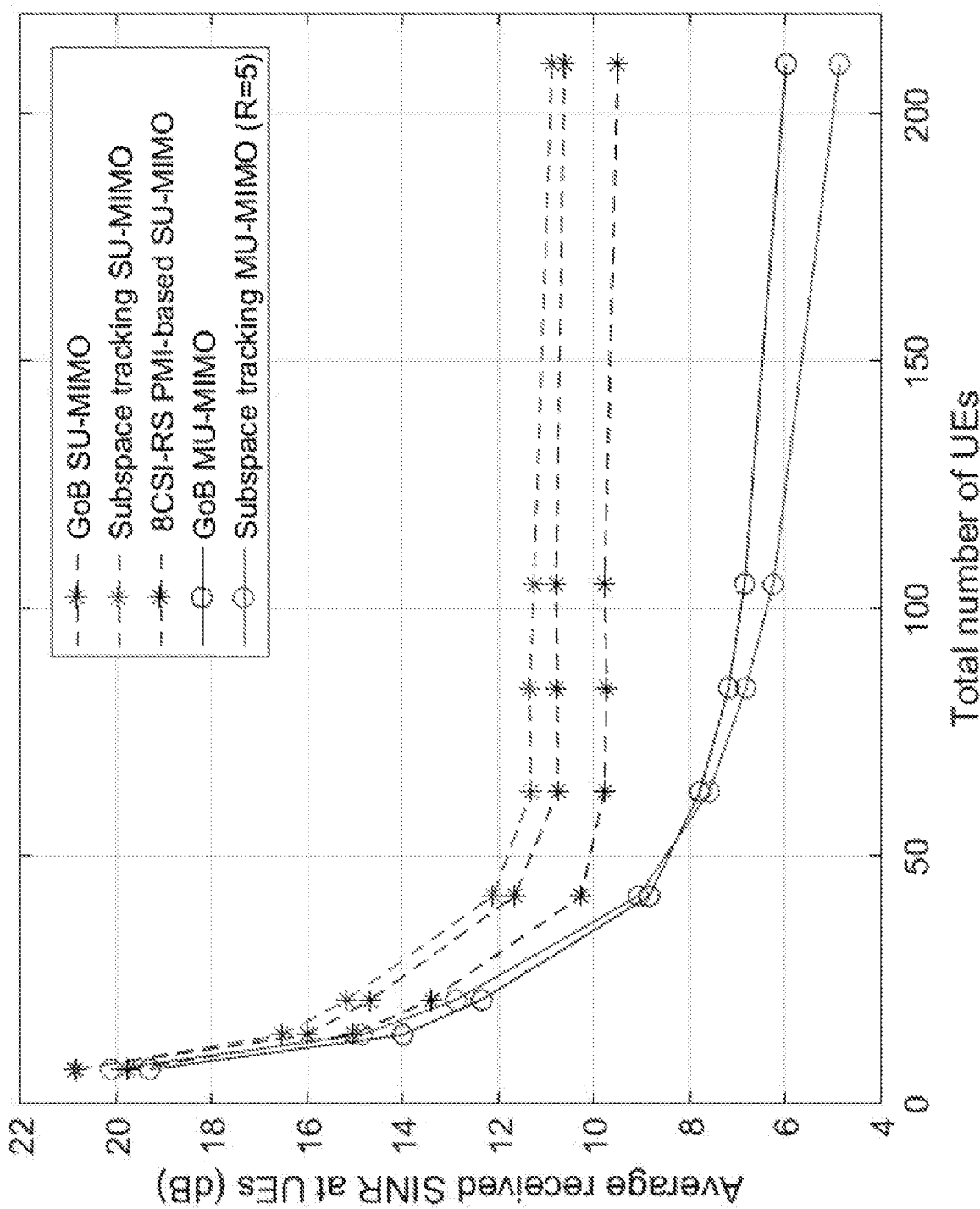
FIG. 15 is a diagram of average received signal-to-interference-plus-noise ratio at the user equipments versus a number of user equipments.

FIG. 15 shows the average received SINR (in dB) at the UEs 22 per a total number of UEs 22. For the SU-MIMO case, subspace tracking described herein provides the highest received SINR as it efficiently directs the transmission power along the dominant receive direction of the UE 22. The ability of the subspace tracking algorithm described herein to effectively suppress the MU-MIMO interference as illustrated in FIG. 15 as indicated at the simulation point with forty-two UEs 22. At this point, it is illustrated from FIG. 15 that the subspace tracking algorithm has a higher number of paired UEs 22, yet, the average received SINR at each UE 22 is higher than the received SINR with MU-MIMO GoB.

Therefore, the subspace tracking algorithms described herein provide for the tracking of not only the dominant eigenvector, but also the signal space of the covariance matrix of the uplink channel of the UEs 22. The uplink signal space information is used (possibly after frequency transformation) to calculate MU-MIMO precoders that can suppress the MU-MIMO interference on the receive signal subspace of all the paired UEs 22 and not only on the dominant eigenvector directions.

SOME EXAMPLES

Example A1. A base station configured to communicate with a plurality of user equipments (UEs), the base station configured to, and/or comprising a radio interface and/or comprising processing circuitry configured to:
  track a downlink signal subspace for each user equipment, UE, of the plurality of UEs; and
  determine MU-MIMO precoders based on the downlink signal subspace for each UE of the plurality of UEs, the MU-MIMO precoders being configured to at least in part suppress intra-cell MU-MIMO interference.

Example A2. The base station of Example A1, wherein the determining of the MU-MIMO precoders includes determining MU-MIMO beamforming vectors of paired UEs of the plurality of UEs, the beamforming vectors are configured to at least in part suppress intra-cell MU-MIMO interference.

Example A3. The base station of Example A1, wherein the downlink signal subspace includes dominant eigenvectors and eigenvalues of a covariance matrix of the downlink channel for the UE.

Example B1. A method implemented in a base station that is configured to communicate with a plurality of user equipment's (UEs), the method comprising:
  tracking a downlink signal subspace for each user equipment, UE, of the plurality of UEs; and
  determining MU-MIMO precoders based on the downlink signal subspace for each UE of the plurality of UEs, the MU-MIMO precoders being configured to at least in part suppress intra-cell MU-MIMO interference.

Example B2. The method of Example C1, wherein the determining of the MU-MIMO precoders includes determining MU-MIMO beamforming vectors of paired UEs of the plurality of UEs, the beamforming vectors are configured to at least in part suppress intra-cell MU-MIMO interference.

Example B3. The method of Example C1, wherein the downlink signal subspace includes dominant eigenvectors and eigenvalues of a covariance matrix of the downlink channel for the UE.

Example C1. A user equipment (UE) configured to communicate with a base station, the UE configured to, and/or comprising a radio interface and/or processing circuitry configured to:
  perform wireless communication using MU-MIMO precoders, the MU-MIMO precoders being based on tracking of a downlink signal subspace for each UE of a plurality of UEs where the MU-MIMO precoders are configured to at least in part suppress intra-cell MU-MIMO interference.

Example C2. The UE of Example C1, wherein the MU-MIMO precoders correspond to MU-MIMO beamforming vectors of paired UEs of the plurality of UEs, the beamforming vectors are configured to at least in part suppress intra-cell MU-MIMO interference.

Example C3. The UE of Example C1, wherein the downlink signal subspace includes dominant eigenvectors and eigenvalues of a covariance matrix of the downlink channel for the UE.

Example D1. A method implemented in a user equipment (UE), the method comprising performing wireless communication using MU-MIMO precoders, the MU-MIMO precoders being based on tracking of a downlink signal subspace for each UE of a plurality of UEs where the MU-MIMO precoders are configured to at least in part suppress intra-cell MU-MIMO interference.

Example D2. The method of Example D1, wherein the MU-MIMO precoders correspond to MU-MIMO beamforming vectors of paired UEs of the plurality of UEs, the beamforming vectors are configured to at least in part suppress intra-cell MU-MIMO interference.

Example D3. The method of Example D1, wherein the downlink signal subspace includes dominant eigenvectors and eigenvalues of a covariance matrix of the downlink channel for the UE.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
AAS Adaptive Antenna System
CSIT Channel State Information at the Transmitter
CRS Cell-specific Reference Symbols
DMRS Demodulation Reference Signals
eNB Evolved Node B
FDD Frequency Division Duplex
GoB Grid of Beams
LTE Long Term Evolution
MIMO Multiple Input Multiple Output
MU Multi-User
NLOS Non-Line of Sight
PASTd Projection Approximation Subspace Tracking with deflation
SINR Signal to Interference-plus-Noise Ratio
SINR Signal to Leakage-plus-Noise Ratio
SRS Sounding Reference Signal
SU Single-User
TDD Time Division Duplex
UE User Equipment
ZF Zero-Forcing It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A base station configured to communicate with a plurality of user equipments, UEs, the base station comprising processing circuitry configured to:
   track a downlink signal subspace for each UE of the plurality of UEs; and
   determine a Multi-User Multiple-Input Multiple-Output, MU-MIMO, precoders based on the tracked downlink signal subspace for each UE of the plurality of UEs, the MU-MIMO precoders being configured to at least in part suppress intra-cell MU-MIMO interference.

2. The base station of claim 1, wherein the determining of the MU-MIMO precoders includes determining MU-MIMO beamforming vectors of paired UEs of the plurality of UEs, the beamforming vectors are configured to at least in part suppress intra-cell MU-MIMO interference.

3. The base station of claim 1, wherein the downlink signal subspace includes significant eigenvectors and eigenvalues of a covariance matrix of the downlink channel for each UE of the plurality of UEs.

4. The base station of claim 3, wherein the tracking of the downlink signal subspace for each UE of the plurality of UEs includes:
   estimating an M×R matrix whose columns are R significant eigenvectors of the covariance matrix, where M and R are positive integers; and
   estimating an R×R diagonal matrix corresponding to eigenvalues of the covariance matrix.

5. The base station of claim 3, wherein a plurality of dimensions of the covariance matrix are less than or equal to a number of antennas of the base station.

6. The base station of claim 3, wherein the covariance matrix corresponds to the covariance matrix for an antenna polarization.

7. The base station of claim 1, wherein the tracking of the downlink signal subspace is based on at least one of an uplink demodulation reference signal, DMRS, and an uplink sounding reference signal, SRS.

8. The base station of claim 1, wherein the processing circuitry is further configured to:
   determine a Single User, SU, -MIMO precoder for a UE of the plurality of UEs based on the tracked downlink signal subspace;

estimate signal leakage between two UEs of the plurality of UEs based on the SU-MIMO precoders; and pair at least two UEs of the plurality of UEs if the estimated leakage is below a predefined threshold.

9. The base station of claim 1, wherein the MU-MIMO precoders are for the at least two UEs of the plurality of UEs that are paired for MU-MIMO co-scheduling.

10. The base station of claim 1, wherein the tracking of the downlink signal subspace for each UE of the plurality of UEs is performed iteratively.

11. A method for a base station configured to communicate with a plurality of user equipments, UEs, the method comprising:
tracking a downlink signal subspace for each UE of the plurality of UEs; and
determining a Multi-User Multiple-Input Multiple-Output, MU-MIMO, precoder based on the tracked downlink signal subspace for each UE of the plurality of UEs, the MU-MIMO precoders being configured to at least in part suppress intra-cell MU-MIMO interference.

12. The method of claim 11, wherein the determining of the MU-MIMO precoders includes determining MU-MIMO beamforming vectors of paired UEs of the plurality of UEs, the beamforming vectors are configured to at least in part suppress intra-cell MU-MIMO interference.

13. The method of claim 11, wherein the downlink signal subspace includes significant eigenvectors and eigenvalues of a covariance matrix of the downlink channel for each UE of the plurality of UEs.

14. The method of claim 13, wherein the tracking of the downlink signal subspace for each UE of the plurality of UEs includes:
estimating an M×R matrix whose columns are R significant eigenvectors of the covariance matrix, where M and R are positive integers; and
estimating an R×R diagonal matrix corresponding to eigenvalues of the covariance matrix.

15. The method of claim 13, wherein a plurality of dimensions of the covariance matrix are less than or equal to a number of antennas of the base station.

16. The method of claim 13, wherein the covariance matrix corresponds to the covariance matrix for an antenna polarization.

17. The method of claim 11, wherein the tracking of the downlink signal subspace is based on at least one of an uplink demodulation reference signal, DMRS, and an uplink sounding reference signal, SRS.

18. The method of claim 11, further comprising:
determining a Single User, SU, -MIMO precoder for a UE of the plurality of UEs based on the tracked downlink signal subspace;
estimating signal leakage between two UEs of the plurality of UEs based on the SU-MIMO precoders; and
pairing at least two UEs of the plurality of UEs if the estimated leakage is below a predefined threshold.

19. The method of claim 11, wherein the MU-MIMO precoders are for the at least two of the plurality of UEs that are paired for MU-MIMO co-scheduling.

20. The method of claim 11, wherein the tracking of the downlink signal subspace for each UE of the plurality of UEs is performed iteratively.

21. A first user equipment, UE, configured to communicate with a base station, the first UE comprising processing circuitry configured to:
perform wireless communication using Multi-User Multiple-Input Multiple-Output, MU-MIMO, precoders, the MU-MIMO precoders being based on tracking of a downlink signal subspace for each UE of a plurality of UEs, the plurality of UEs including the first UE, the MU-MIMO precoders being configured to at least in part suppress intra-cell MU-MIMO interference.

22. A method of a first user equipment, UE, configured to communicate with a base station, the method comprising:
performing wireless communication using Multi-User Multiple-Input Multiple-Output, MU-MIMO, precoders, the MU-MIMO precoders being based on tracking of a downlink signal subspace for each UE of a plurality of UEs, the plurality of UEs including the first UE, the MU-MIMO precoders being configured to at least in part suppress intra-cell MU-MIMO interference.

* * * * *